(12) United States Patent
Kim et al.

(10) Patent No.: US 10,404,898 B2
(45) Date of Patent: *Sep. 3, 2019

(54) METHOD FOR OPERATING CAMERA UNDERWATER

(71) Applicant: HiDeep Inc., Gyeonggi-do (KR)

(72) Inventors: Seyeob Kim, Gyeonggi-do (KR);
Sangsic Yoon, Gyeonggi-do (KR);
Bonkee Kim, Gyeonggi-do (KR);
Hojun Moon, Gyeonggi-do (KR);
Taehoon Kim, Gyeonggi-do (KR);
Sunyoung Kwon, Gyeonggi-do (KR)

(73) Assignee: HiDeep Inc. (KP)

( * ) Notice: Subject to any disclaimer, the term of this patent is extended or adjusted under 35 U.S.C. 154(b) by 0 days.

This patent is subject to a terminal disclaimer.

(21) Appl. No.: 16/121,438

(22) Filed: Sep. 4, 2018

(65) Prior Publication Data

US 2018/0376040 A1    Dec. 27, 2018

Related U.S. Application Data

(63) Continuation of application No. 14/663,551, filed on Mar. 20, 2015, now Pat. No. 10,104,270.

(30) Foreign Application Priority Data

Mar. 24, 2014  (KR) .................... 10-2014-0034169
Apr. 22, 2014  (KR) .................... 10-2014-0048335
(Continued)

(51) Int. Cl.
*G06F 3/044*    (2006.01)
*H04N 5/225*    (2006.01)
(Continued)

(52) U.S. Cl.
CPC .......... *H04N 5/2252* (2013.01); *G03B 17/08* (2013.01); *G06F 3/044* (2013.01);
(Continued)

(58) Field of Classification Search
CPC ...... G06F 3/044; G06F 3/0416; G06F 3/0414; G06F 3/0418; G06F 3/0436; G06F 3/048;
(Continued)

(56) References Cited

U.S. PATENT DOCUMENTS 8,982,097 B1     3/2015  Kuzo et al.
2011/0096025 A1  4/2011  Slobodin et al.
(Continued)

FOREIGN PATENT DOCUMENTS

JP    62051058      3/1987
JP    2005328224    11/2005
(Continued)

OTHER PUBLICATIONS

Corresponding Office Action issued by the JPO dated Apr. 19, 2016.
(Continued)

*Primary Examiner* — Duc Q Dinh
(74) *Attorney, Agent, or Firm* — The Belles Group, P.C.

(57) ABSTRACT

In one embodiment, a method for operating a camera included in a touch input device including a touch screen is disclosed. A processor determines a capacitance pattern for a varying capacitance throughout the touch screen when the touch screen is underwater and no touch input occurs. The processor resets a varying reference capacitance for determining whether a touch input by an object occurs or not, the varying reference capacitance being reset based on the determined capacitance pattern when the touch screen is underwater and no touch input occurs. The touch screen
(Continued)

receives a touch pressure by the object underwater. Operation of the camera is controlled according to the touch pressure to the touch screen.

10 Claims, 26 Drawing Sheets

(30) Foreign Application Priority Data

| May 9, 2014 | (KR) | .......................... 10-2014-0055732 |
| Aug. 1, 2014 | (KR) | .......................... 10-2014-0098917 |
| Sep. 19, 2014 | (KR) | .......................... 10-2014-0124920 |
| Oct. 24, 2014 | (KR) | .......................... 10-2014-0145022 |
| Dec. 22, 2014 | (KR) | .......................... 10-2014-0186352 |

(51) Int. Cl.
*G03B 17/08* (2006.01)
*H04N 5/232* (2006.01)
*G06F 3/041* (2006.01)

(52) U.S. Cl.
CPC ....... *H04N 5/23245* (2013.01); *G06F 3/0416* (2013.01); *G06F 2200/1633* (2013.01); *G06F 2203/04105* (2013.01); *G06F 2203/04106* (2013.01)

(58) Field of Classification Search
CPC . G06F 2203/04104; G06F 2203/04105; G06F 3/0488; G06F 3/045; G03B 17/08; H04N 5/23245
USPC .................................................. 345/173–175
See application file for complete search history.

(56) References Cited

U.S. PATENT DOCUMENTS

| 2012/0256867 A1 | 10/2012 | Annacone | |
| 2015/0009173 A1* | 1/2015 | Rodzevski | ............ G06F 3/0414 345/174 |
| 2015/0022481 A1* | 1/2015 | Andersson | .............. G06F 3/044 345/174 |
| 2015/0062069 A1* | 3/2015 | Shin | ........................ G06F 3/044 345/174 |

FOREIGN PATENT DOCUMENTS

| JP | 2008236035 | 10/2008 |
| JP | 2009276821 | 11/2009 |
| JP | 2010033538 | 2/2010 |
| JP | 2010122795 | 6/2010 |
| JP | 2012027701 | 2/2012 |
| JP | 2012256153 | 12/2012 |
| JP | 2013117891 | 6/2013 |
| JP | 2013179536 | 9/2013 |
| JP | 2013186501 | 9/2013 |
| JP | 5353996 | 11/2013 |
| JP | 2014013398 | 1/2014 |
| KR | 1020100025176 | 3/2010 |
| WO | 2010024495 | 3/2010 |

OTHER PUBLICATIONS

Corresponding Office Action issued by the KIPO dated Jul. 10, 2015.
Corresponding Office Action issued by KIPO for KR 10-2017-0079631 dated Sep. 14, 2017.
Corresponding Office Action issued by the KIPO dated Jan. 19, 2016.

* cited by examiner

METHOD FOR OPERATING CAMERA UNDERWATER

CROSS REFERENCE TO RELATED APPLICATIONS

The present application is a continuation of U.S. patent application Ser. No. 14/663,551, filed Mar. 20, 2015, which claims priority under 35 U.S.C. § 119 to Korean Patent Application No. 10-2014-0034169, filed Mar. 24, 2014, Korean Patent Application No. 10-2014-048335, filed Apr. 22, 2014, Korean Patent Application No. 10-2014-055732, filed May 9, 2014, Korean Patent Application No. 10-2014-0098917, filed Aug. 1, 2014, Korean Patent Application No. 10-2014-0124920, filed Sep. 19, 2014, Korean Patent Application No. 10-2014-0145022, filed Oct. 24, 2014, and Korean Patent Application No. 10-2014-0186352, filed Dec. 22, 2014, the disclosures of which are incorporated herein by reference in their entireties.

FIELD OF THE INVENTION

The present invention relates to a method for operating a camera underwater, and more particularly to a method for operating a camera, which is capable of detecting a touch position underwater by touch pressure.

BACKGROUND OF THE INVENTION

A variety of input devices are being used to operate a computing system. For example, input devices like a button, a key, a joystick and a touch screen are being used. Since the touch screen is easy and simple to operate, the touch screen is increasingly being used in operation of the computing system.

The touch screen may include a touch sensor panel which may be a transparent panel including a touch-sensitive surface. Such a touch sensor panel is attached to the front side of a display panel and then the touch-sensitive surface may cover the visible side of the display panel. The touch screen allows a user to operate the computing system by simply touching the screen by a finger, etc. In general, the touch screen recognizes the touch on the panel and touch position, and then the computing system analyzes the touch and performs operations in accordance with the analysis.

However, since the touch screen cannot normally operate underwater, a camera equipped with the touch screen cannot photograph underwater by touching.

Therefore, research is required to make it possible to take photographs underwater by touching.

SUMMARY OF THE INVENTION

One embodiment is a method for underwater operating a camera built in a touch input device including a touch screen, a processor, and a controller. The method includes: performing a first drive mode in which a touch position is detected underwater by a capacitance change amount due to a touch pressure; and controlling operation of the camera underwater according to a touch on the touch screen by an object.

BRIEF DESCRIPTION OF THE DRAWINGS

FIGS. 7a to 7e are flow charts for describing a method for operating a camera underwater in accordance with the embodiment;

DETAILED DESCRIPTION OF THE INVENTION

Figure 1:
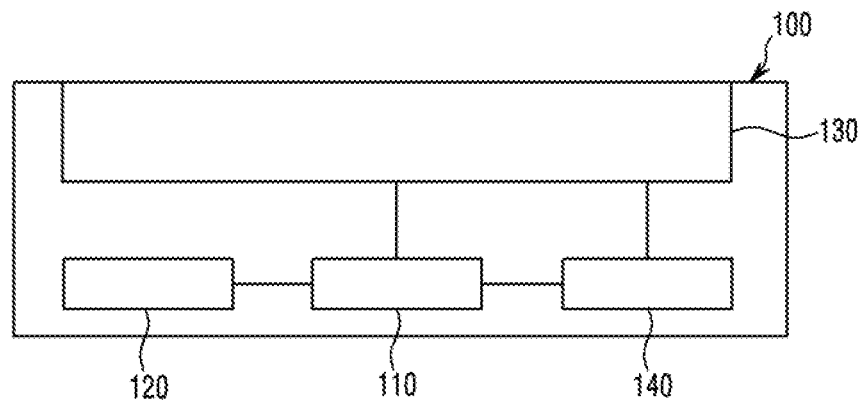
FIG. 1 is a structure view of a touch input device according to an embodiment.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. The following detailed description is not intended to be limited. If adequately described, the scope of the present invention is limited only by the appended claims of the present invention as well as all equivalents thereto. Similar reference numerals in the drawings designate the same or similar functions in many aspects.

Hereafter, a touch input device 100 including a touch screen 130 according to the embodiment of the present invention will be described with reference to the accompanying drawings. Prior to the description of the functions and features of the touch input device 100 according to the embodiment of the present invention, the touch screen 130 included in the touch input device 100 will be described in detail with reference to FIGS. 10 to 18.

Figure 10:
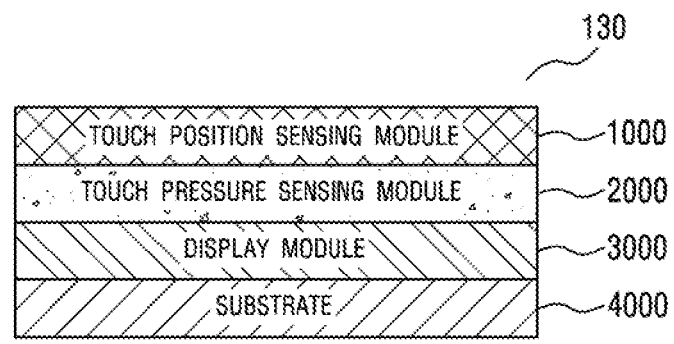
FIG. 10 shows a structure of the touch screen according to the first embodiment.

FIG. 10 shows a structure of the touch screen according to a first embodiment.

As shown in FIG. 10, the touch screen 130 may include a touch position sensing module 1000, a touch pressure sensing module 2000 disposed under the touch position sensing module 1000, a display module 3000 disposed under the touch pressure sensing module 2000, and a substrate 4000 disposed under the display module 3000. For example, the touch position sensing module 1000 and the touch pressure sensing module 2000 may be a transparent panel including a touch-sensitive surface. Hereafter, the modules 1000, 2000, 3000 and 5000 for sensing the touch position and/or touch pressure may be collectively designated as a touch sensing module.

The display module 3000 is able to display the screen to allow a user to visually check contents. Here, the display module 3000 may display by means of a display driver. The display driver (not shown) is a software allowing an operating system to manage or control a display adaptor and is a kind of a device driver.

Figure 18A:
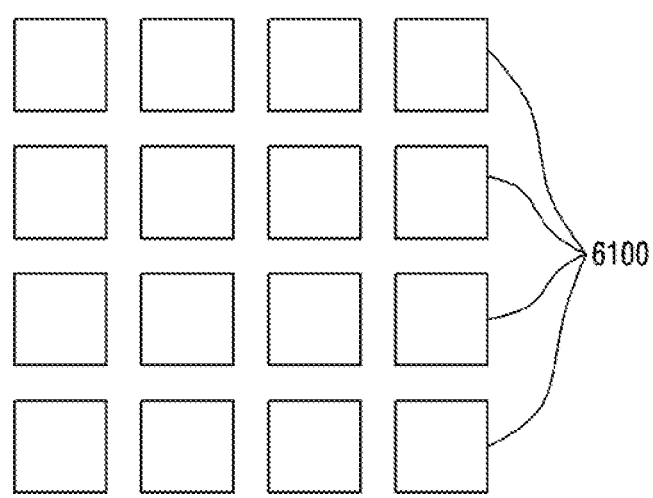
FIGS. 18a to 18d to are structure views showing the shape of an electrode formed in the touch sensing module according to the embodiment.
Figure 18B:
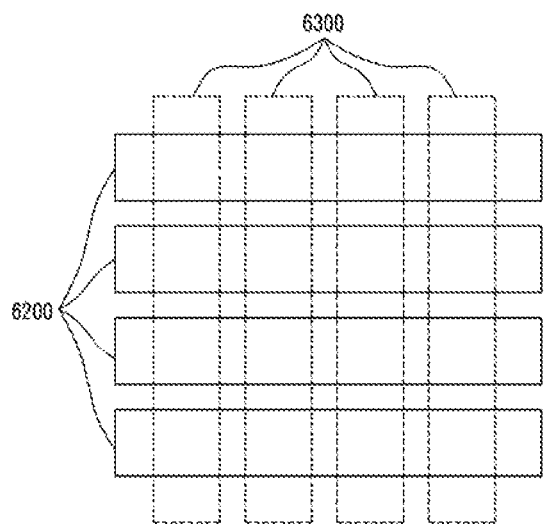
Figure 18C:
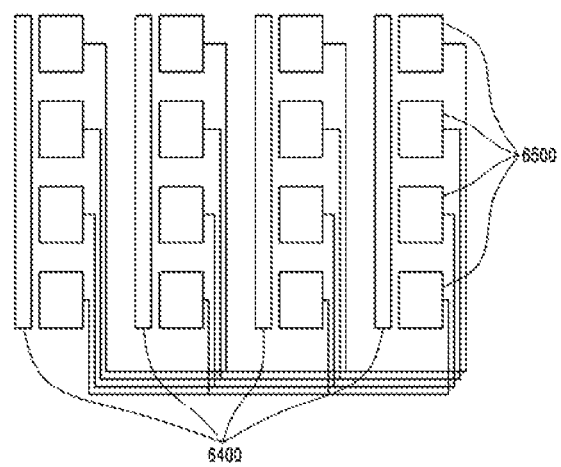

FIGS. 11a to 11d show a structure of the touch position sensing module according to the first embodiment. FIGS. 18a to 18c are structure views showing the shape of as electrode formed in the touch position sensing module according to the embodiment.

Figure 11A:
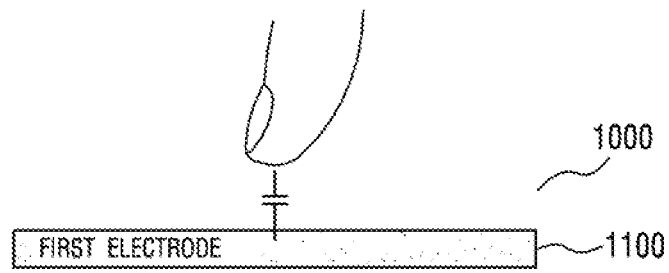
FIGS. 11a to 11d show a structure of a touch position sensing module of the touch screen according to the first embodiment.

As shown in FIG. 11a, the touch position sensing module 1000 according to the embodiment may include a first electrode 1100 formed in one layer. Here, the first electrode 1100 may be, as shown in FIG. 18a, comprised of a plurality of electrodes 6100, and then a driving signal may be input to each electrode 6100 and a sensing signal including information on self-capacitance may be output from each electrode. When an object like a user's finger approaches the first electrode 1100, the finger functions as a ground and the sell-capacitance of first electrode 1100 is changed. Therefore, the touch input device 100 is able to detect the touch position by measuring the self-capacitance of the first electrode 1100, which is changed as the object like the user's finger approaches the touch screen 130.

Figure 11B:
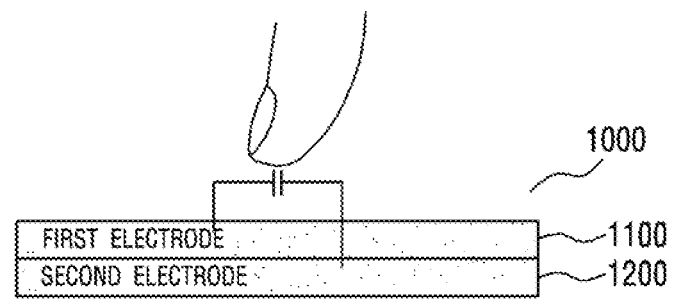

As shown in FIG. 11b, the touch position sensing module 1000 according to the embodiment may include the first electrode 1100 and a second electrode 1200, which are formed on different layers.

Figure 11C:
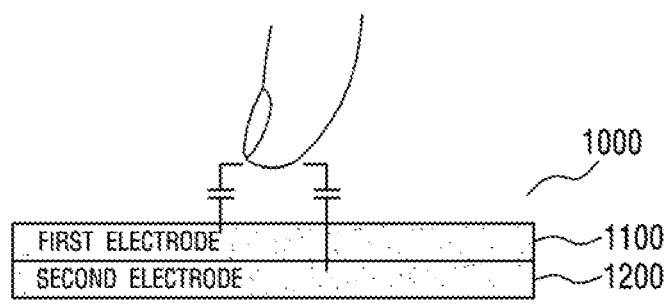

Here, the first and the second electrodes 1100 and 1200 are, as shown, in FIG. 18b, comprised of a plurality of first electrodes 6200 and a plurality of second electrodes 6300 respectively. The plurality of first electrodes 6200 and the plurality of second electrodes 6300 may be arranged to cross each other. A driving signal may be input to any one of the first electrode 6200 and the second electrode 6300, and a sensing signal including information on mutual capacitance may be output from the other. As shown in FIG. 11b, when the object like the user's finger approaches the first electrode 1100 and the second electrode 1200, the finger functions as a ground, so that the mutual capacitance between the first electrode 1100 and the second electrode 1200 is changed. In this case, the touch input device 100 measures the mutual capacitance between the first electrode 1100 and the second electrode 1200, which is changed with the approach of the object like the user's finger to the touch screen 130, and then detects the touch position. Also, the driving signal may be input to the first electrode 6200 and the second electrode 6300, and a sensing signal including information on the self-capacitance may be output from the first and second electrodes 6200 and 6300 respectively. As shown in FIG. 11c, when the object like the user's finger approaches the first electrode 1100 and the second electrode 1200, the finger functions as a ground, so that the self-capacitance of each of the first and second electrodes 1100 and 1200 is changed. In this case, the touch input device 100 measures the self-capacitances of the first electrode 1100 and the second electrode 1200, which is changed with the approach of the object like the user's finger to the touch screen 130, and then detects the touch position.

Figure 11D:
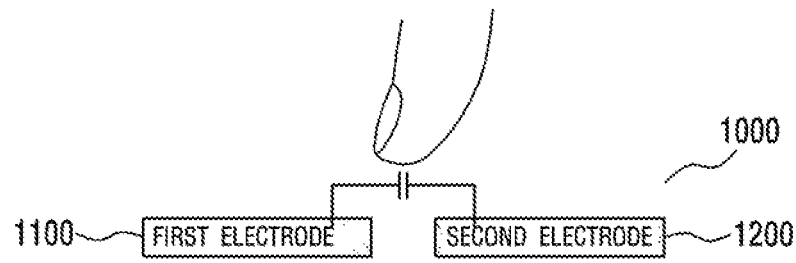

As shown in FIG. 11d, the touch position sensing module 1000 according to the embodiment may include the first electrode 1100 formed in one layer and the second electrode 1200 formed in the same layer as the layer in which the first electrode 1100 has been formed.

Here, the first and the second electrodes 1100 and 1200 are, as shown in FIG. 18c, comprised of a plurality of first electrodes 6400 and a plurality of second electrodes 6500 respectively. The plurality of first electrodes 6400 and the plurality of second electrodes 6500 may be arranged without crossing each other and may be arranged such that the plurality of second electrodes 6500 are connected to each other in a direction crossing the extension direction of the each first electrodes 6400. A principle of detecting the touch position by using the first electrode 6400 or the second electrode 6500 shown in FIG. 11d is the same as that of the foregoing referring to FIG. 11c, and thus a description of the principle will be omitted.

FIGS. 12a to 12f show a structure of the touch pressure sensing module according to the first embodiment. FIGS. 18a to 18d are structure views showing the shape of the electrode formed in the touch pressure sensing module 2000 according to the embodiment.

As shown in FIGS. 12a to 12f, the touch pressure sensing module 2000 according to the first embodiment may include a spacer layer 2400. The spacer layer 2400 may be implemented by an air gap. The spacer may be comprised of an impact absorbing material according to the embodiment and may be also filled with a dielectric material according to the embodiment.

As shown in FIGS. 12a to 12d, the touch pressure sensing module 2000 according to the first embodiment may include a reference potential layer 2500. The reference potential layer 2500 may have any potential. For example, the reference potential layer may be a ground layer having a ground potential. Here, the reference potential layer may include a layer which is parallel with a two-dimensional plane in which a below-described first electrode 2100 for sensing the touch pressure has been formed or a two-dimensional plane in which a below-described second electrode 2200 for sensing the touch pressure has been formed. Although it has been described in FIGS. 12a to 12d that the touch pressure sensing module 2000 includes the reference potential layer 2500, there is no limit to this. The touch pressure sensing module 2000 does not include the reference potential layer 2500, and the display module 3000 or the substrate 4000 which is disposed under the touch pressure sensing module 2000 may function as the reference potential layer.

Figure 12A:
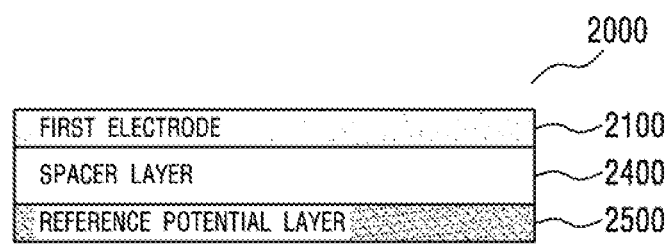
FIGS. 12a to 12f show a structure of a touch pressure sensing module of the touch screen according to the first embodiment.

As shown in FIG. 12a, the touch pressure sensing module 2000 according to the embodiment may include the first electrode 2100 formed in one layer, the spacer layer 2400 formed under the layer in which the first electrode 2100 has been formed, and the reference potential layer 2500 formed under the spacer layer 2400.

Figure 12B:
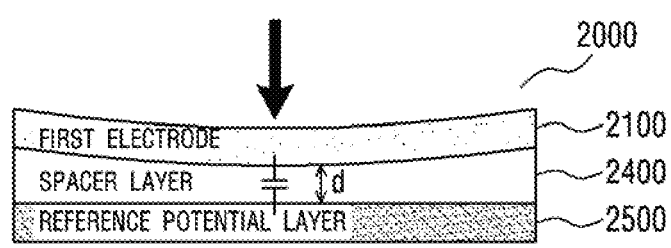
Figure 18D:
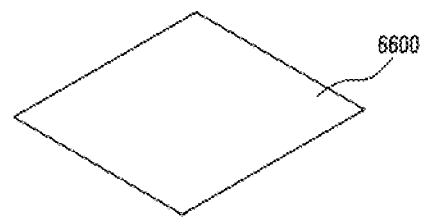

Here, the first electrode 2100 is, as shown in FIG. 18a, comprised of the plurality of electrodes 6100. Then, the driving signal may be input to each of the electrodes 6100 and the sensing signal including information on the self-capacitance may be output from the each electrode. When a pressure is applied to the touch screen 130 by the object like the user's finger or stylus, the first electrode 2100 is, as shown in FIG. 12b, curved at least at the touch position, so that a distance "d" between the first electrode 2100 and the reference potential layer 2500 is changed, and thus, the self-capacitance of the first electrode 2100 is changed. Accordingly, the touch input device 100 is able to detect the touch pressure by measuring the self-capacitance of the first electrode 2100, which is changed by the pressure that the object like the user's finger or stylus applies to the touch screen 130. As such, since the first electrode 2100 is comprised of the plurality of electrodes 6100, the touch input device 100 is able to detect the pressure of each of multiple touches which have been simultaneously input to the touch screen 130. Also, when there is no requirement for detecting the pressure of each of multiple touches, it is only required to detect overall pressure applied to the touch screen 130 irrespective of the touch position. Therefore, the first electrode 2100 of the touch pressure sensing module 2000 may be, as shown in FIG. 18d, comprised of one electrode 6600.

Figure 12C:
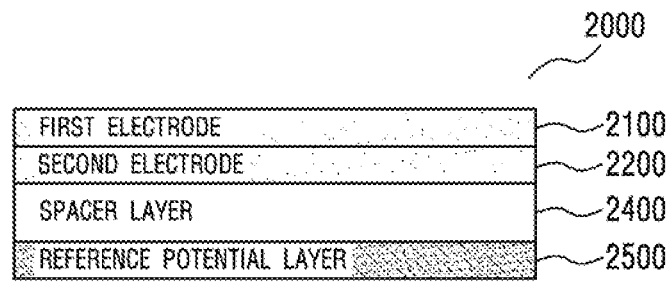

As shown in FIG. 12c, the touch pressure sensing module 2000 according to the embodiment may include the first electrode 2100, the second electrode 2200 formed under the layer in which the first electrode 2100 has been formed, the spacer layer 2400 formed under the layer in which the second electrode 2200 has been formed, and the reference potential layer 2500 formed under the spacer layer 2400.

Figure 12D:
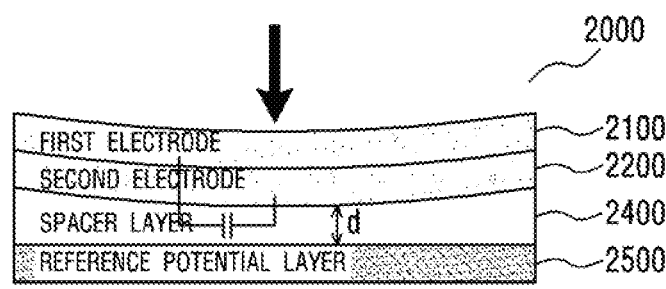

Here, the first electrode 2100 and the second electrode 2200 may be configured and arranged as shown in FIG. 18b. A driving signal is input to any one of the first electrode 6200 and the second electrode 6300, and a sensing signal including information on the mutual capacitance may be output from the other. When a pressure is applied to the touch screen 130, the first electrode 2100 and the second electrode 2200 are, as shown in FIG. 12d, curved at least at the touch position, so that a distance "d" between the reference potential layer 2500 and both the first electrode 2100 and the second electrode 2200 is changed, and thus, the mutual capacitance between the first electrode 2100 and the second electrode 2200 is changed. Accordingly, the touch input device 100 is able to detect the touch pressure by measuring the mutual capacitance between the first electrode 2100 and the second electrode 2200, which is changed by the pressure that is applied to the touch screen 130. As such, since the first electrode 2100 and the second electrode 2200 are comprised of the plurality of first electrodes 6200 and the plurality of second electrodes 6300 respectively, the touch input device 100 is able to detect the pressure of each of multiple touches which have been simultaneously input to the touch screen 130. Also, when there is no requirement for detecting the pressure of each of multiple touches, at least one of the first electrode 2100 and the second electrode 2200 of the touch pressure sensing module 2000 may be, as shown in FIG. 18d, comprised of the one electrode 6600.

Here, even when the first electrode 2100 and the second electrode 2200 are formed in the same layer, the touch pressure can be also detected as described in FIG. 12c. The first electrode 2100 and the second electrode 2200 may be configured and arranged as shown in FIG. 18c, or may be comprised of the one electrode 6600 as shown in FIG. 18d.

Figure 12E:
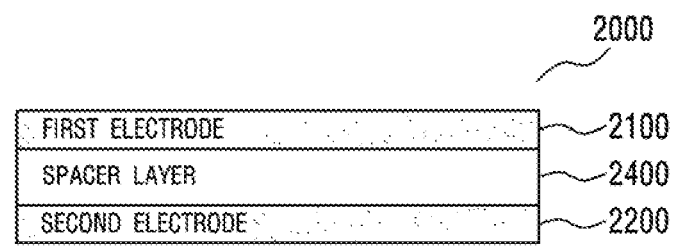

As shown in FIG. 12e, the touch pressure sensing module 2000 according to the embodiment may include the first electrode 2100 formed in one layer, the spacer layer 2400 formed under the layer in which the first electrode 2100 has been formed, and the second electrode 2200 formed under the spacer layer 2400.

Figure 12F:
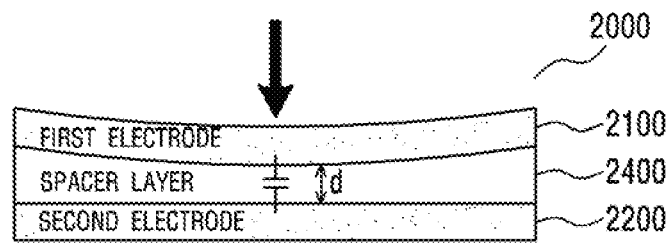

In FIG. 12e, the configuration and operation of the first electrode 2100 and the second electrode 2200 are the same as those of the foregoing referring to FIG. 12c, and thus, a description of the configuration and operation will be omitted. When a pressure is applied to the touch screen 130, the first electrode 2100 is, as shown in FIG. 12f, curved at least at the touch position, so that a distance "d" between the first electrode 2100 and the second electrode 2200 is changed, and thus, the mutual capacitance between the first electrode 2100 and the second electrode 2200 is changed. Accordingly, the touch input device 100 is able to detect the touch pressure by measuring the mutual capacitance between the first electrode 2100 and the second electrode 2200.

Figure 13:
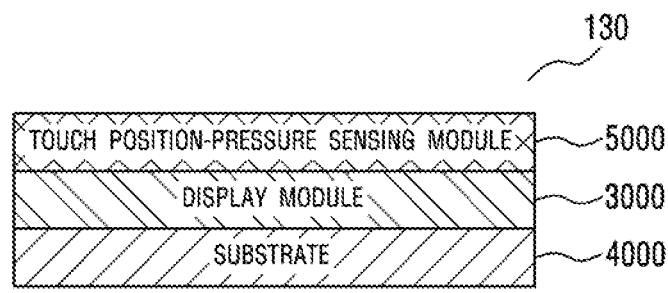
FIG. 13 shows a structure of the touch semen according to the second embodiment.

As shown in FIG. 13, a touch screen 130 according to a second embodiment may include a touch position-pressure sensing module 5000, a display module 3000 disposed under the touch position-pressure sensing module 5000, and a substrate 4000 disposed under the display module 3000.

Unlike the embodiment shown in FIG. 10, the touch position-pressure sensing module 5000 according to the embodiment shown in FIG. 13 includes at least one electrode for sensing the touch position, and at least one electrode for sensing the touch pressure. At least one of the electrodes is used to sense both the touch position and the touch pressure. As such, the electrode for sensing the touch position and the electrode for sensing the touch pressure are shared, so that it is possible to reduce the manufacturing cost of the touch position-pressure sensing module, to reduce the overall thickness of the touch screen 130 and to simplify the manufacturing process. In the sharing of the electrode for sensing the touch position and the electrode for sensing the touch pressure, when it is necessary to distinguish between the sensing signal including information on the touch position and the sensing signal including information on the touch pressure, it is possible to distinguish and sense the touch position and the touch pressure by differentiating a frequency of the driving signal for sensing the touch position from a frequency of the driving signal for sensing the touch pressure, or by differentiating a time interval for sensing the touch position from a time interval for sensing the touch pressure.

FIGS. 14a to 14k show a structure of the touch position-pressure sensing module according to the second embodiment. As shown in FIGS. 14a to 14k, the touch position-pressure sensing module 5000 according to the second embodiment may include a spacer layer 5400.

As shown in FIGS. 14a to 14i, the touch position-pressure sensing module 5000 according to the embodiment may include a reference potential layer 5500. The reference potential layer 5500 is the same as that of the foregoing referring to FIGS. 12a to 12d, and thus, a description of the reference potential layer 5500 will be omitted. The reference potential layer may include a layer which is parallel with a two-dimensional plane in which a below-described first electrode 5100 for sensing the touch pressure has been formed, a two-dimensional plane in which a below-described second electrode 5200 for sensing the touch pressure has been formed, or a two-dimensional plane in which a below-described third electrode 5300 for sensing the touch pressure has been formed.

Figure 14A:
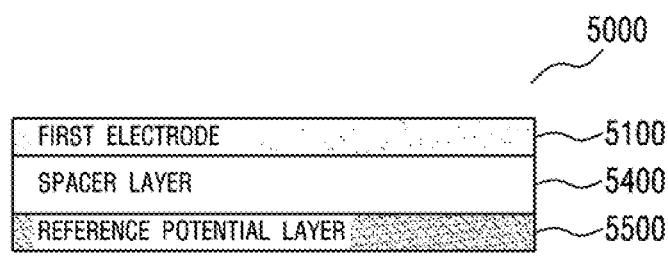
FIGS. 14a to 14k show a structure of a touch position-pressure sensing module of the touch screen according to the second embodiment.

As shown in FIG. 14a, the touch position-pressure sensing module 5000 according to tire embodiment may include the first electrode 5100 formed in one layer, the spacer layer 5400 formed under the layer in which the first electrode 5100 has been formed, and the reference potential layer 5500 formed under the spacer layer 5400.

Figure 14B:
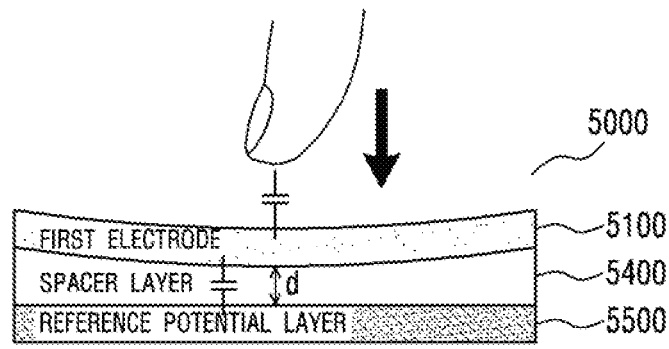

A description of the configuration of FIGS. 14a and 14b is similar to the description referring to FIGS. 12a and 12b. Hereafter, only the difference between them will be described. As shown in FIG. 14b, when the object like the user's finger approaches the first electrode 5100, the finger functions as a ground and the touch position can be detected by the change of the self-capacitance of the first electrode 5100. Also, when a pressure is applied to the touch screen 130 by the object, a distance "d" between the first electrode 5100 and the reference potential layer 5500 is changed, and thus, the touch pressure can be detected by the change of the self-capacitance of the first electrode 5100.

Figure 14C:
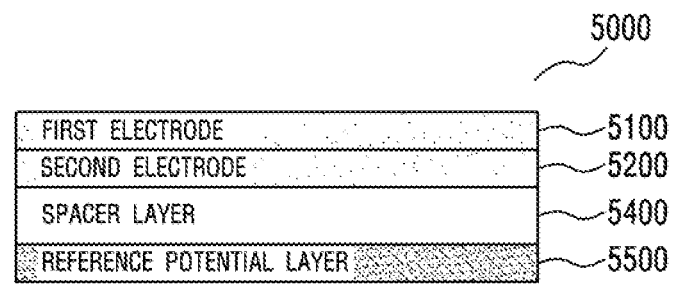

As shown in FIG. 14c, the touch position-pressure sensing module 5000 according to the embodiment may include the first electrode 5100 formed in one layer, the second electrode 5200 formed in a layer under the layer in which the first electrode 5100 has been formed, the spacer layer 5400 formed under the layer in which the second electrode 5200 has been formed, and the reference potential layer 5500 formed under the spacer layer 5400.

Figure 14D:
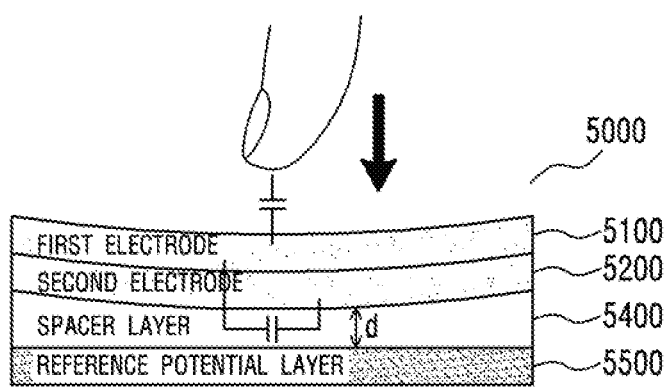

A description of the configuration of FIGS. 14c to 14f is similar to the description referring to FIGS. 12c and 12d. Hereafter, only the difference between them will be described. Here, the first electrode 5100 and the second electrode 5200 may be, as shown in FIG. 18a, comprised of the plurality of electrodes 6100 respectively. As shown in FIG. 14d, when the object like the user's finger approaches the first electrode 5100, the finger functions as a ground and the touch position can be detected by the change of the self-capacitance of the first electrode 5100. Also, when a pressure is applied to the touch screen 130 by the object, a distance "d" between the reference potential layer 5500 and both the first electrode 5100 and the second electrode 5200 is changed, and thus, the touch pressure can be detected by the change of the mutual capacitance between the first electrode 5100 and the second electrode 5200.

Also, according to the embodiment, each of the first and second electrodes 5100 and 5200 may be, as shown in FIG. 18b, comprised of the plurality of first electrodes 6200 and the plurality of second electrodes 6300. The plurality of first electrodes 6200 and the plurality of second electrodes 6300 may be arranged to cross each other. Here, the touch position can be detected by the change of the mutual capacitance between the first electrode 5100 and the second electrode 5200, and the touch pressure can be defected by the change of the self-capacitance of the second electrode 5200 according to the change of a distance "d" between the second electrode 5200 and the reference potential layer 5500. Also, according to the embodiment, the touch position can be detected by the change of the mutual capacitance between the first electrode 5100 and the second electrode 5200, and also, the touch pressure can be detected by the change of the mutual capacitance between the first electrode 5100 and the second electrode 5200 according to the change of the distance "d" between the reference potential layer 5500 and both the first electrode 5100 and the second electrode 5200.

Here, even when the first electrode 5100 and the second electrode 5200 are formed in the same layer, the touch position and touch pressure can be also detected as described with reference to FIGS. 14c and 14d. However, in FIGS. 14c and 14d, regarding the embodiment where the electrode should be configured as shown in FIG. 18b, when the first electrode 5100 and the second electrode 5200 are formed in the same layer, the first electrode 5100 and the second electrode 5200 may be configured as shown in FIG. 18c.

Figure 14E:
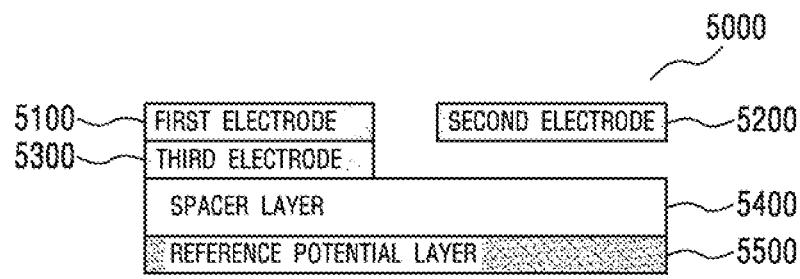

As shown in FIG. 14e, the touch position-pressure sensing module 5000 according to the embodiment may include the first electrode 5100 and the second electrode 5200 which have been in the same layer, the third electrode 5300 which has been formed in a layer under the layer in which the first electrode 5100 and the second electrode 5200 have been formed, the spacer layer 5400 formed under the layer in which the third electrode 5300 has been formed, and the reference potential layer 5500 formed under the spacer layer 5400.

Figure 14F:
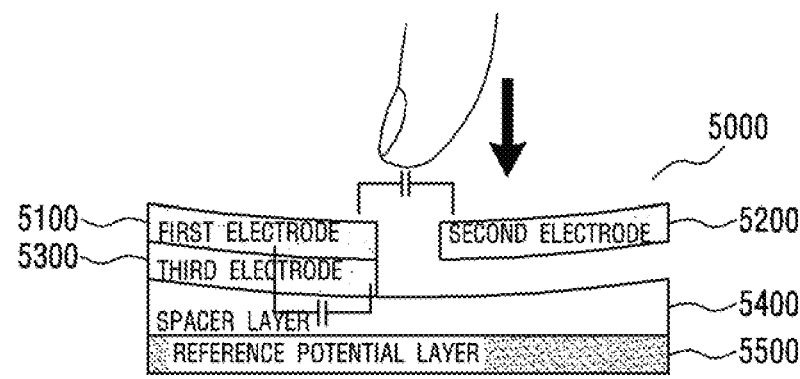

Here, the first electrode 5100 and the second electrode 5200 may be configured and arranged as shown in FIG. 18c, and the first electrode 5100 and the third electrode 5300 may be configured and arranged as shown in FIG. 18b. As shown in FIG. 14f when the object like the user's finger approaches the first electrode 5100 and the second electrode 5200, the mutual capacitance between the first electrode 5100 and the second electrode 5200 is changed, so that the touch position can be detected. When a pressure is applied to the touch screen 130 by the object, a distance "d" between the reference potential layer 5500 and both the first electrode 5100 and the third electrode 5300 is changed, and then the mutual capacitance between the first electrode 5100 and the third electrode 5300 is hereby changed, so that the touch pressure can be detected. Also, according to the embodiment, the touch position can be detected by the change of the mutual capacitance between the first electrode 5100 and the third electrode 5300, and the touch pressure can be detected by the change of the mutual capacitance between the first electrode 5100 and the second electrode 5200.

Figure 14G:
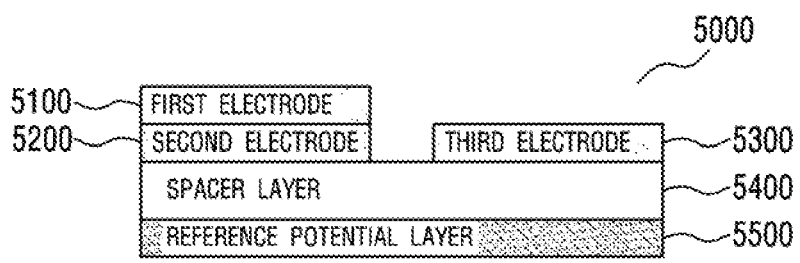

As shown in FIG. 14g, the touch position-pressure sensing module 5000 according to the embodiment may include the first electrode 5100 formed in one layer, the second electrode 5200 formed in a layer under the layer in which the first electrode 5100 has been formed, the third electrode 5300 formed in the same layer as the layer in which the second electrode 5200 has been formed, the spacer layer 5400 formed under the layer in which the second electrode 5200 and the third electrode 5300 have been formed, and the reference potential layer 5500 formed under the spacer layer 5400.

Figure 14H:
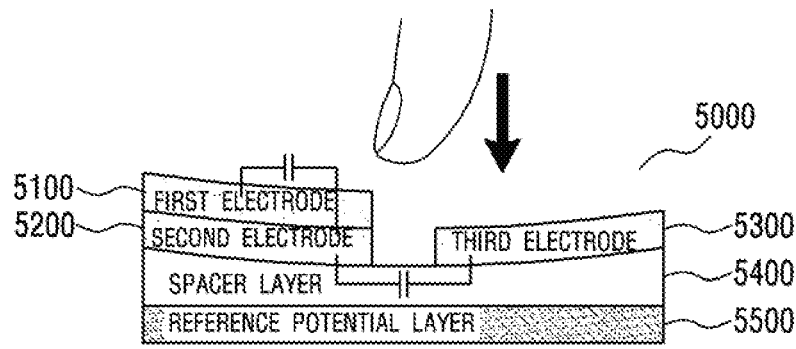

Here, the first electrode 5100 and the second electrode 5200 may be configured and arranged as shown in FIG. 18b, and the second electrode 5200 and the third electrode 5300 may foe configured and arranged as shown in FIG. 18c. In FIG. 14h, the touch position can be detected by the change of the mutual capacitance between the first electrode 5100 and the second electrode 5200, and the touch pressure can be detected by the change of the mutual capacitance between the second electrode 5200 and the third electrode 5300. Also, according to the embodiment, the touch position can be detected by the change of the mutual capacitance between the first electrode 5100 and the third electrode 5300, and the touch pressure can be detected by the change of the mutual capacitance between the first electrode 5100 and the second electrode 5200.

Figure 14I:
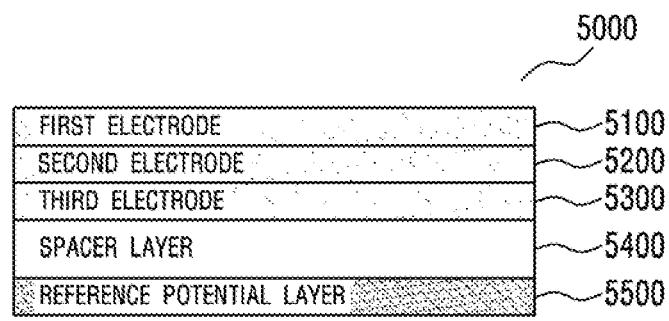

As shown in FIG. 14i, the touch position-pressure sensing module 5000 according to the embodiment may include the first electrode 5100 formed in one layer, the second electrode 5200 formed in a layer under the layer in which the first electrode 5100 has been formed, the third electrode 5300 formed under the layer in which the second electrode 5200 has been formed, the spacer layer 5400 formed under the layer in which the third electrode 5300 has been formed, and the reference potential layer 5500 formed under the spacer layer 5400.

Here, the first electrode 5100 and the second electrode 5200 may be configured and arranged as shown in FIG. 18b, and the second electrode 5200 and the third electrode 5300 may be also configured and arranged as shown in FIG. 18b. Here, when the object like the user's finger approaches the first electrode 5100 and the second electrode 5200, the finger functions as a ground and the touch position can be detected by the change of the mutual capacitance between the first electrode 5100 and the second electrode 5200. Also, when a pressure is applied to the touch screen 130 by the object, a distance "d" between the reference potential layer 5500 and both the second electrode 5200 and the third electrode 5300 is changed, so that the touch pressure can be detected by the change of the mutual capacitance between the second electrode 5200 and the third electrode 5300. Also, according to the embodiment when the object like the user's finger approaches the first electrode 5100 and the second electrode 5200, the finger functions as a ground, so that the touch position can be detected by the change of the self-capacitance of each of the first and second electrodes 5100 and 5200.

Figure 14J:
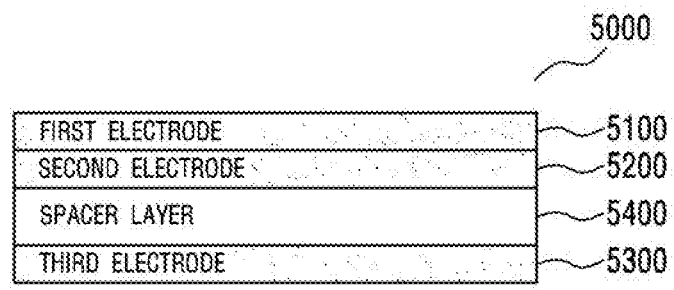

As shown in FIG. 14*j*, the touch position-pressure sensing module 5000 according to the embodiment may include the first electrode 5100 formed in one layer, the second electrode 5200 formed in a layer under the layer in which the first electrode 5100 has been formed, the spacer layer 5400 formed under the layer in which the second electrode 5200 has been formed, and the third electrode 5300 formed under the spacer layer 5400.

Here, the first electrode 5100 and the second electrode 5200 may be configured and arranged as shown in FIG. 18*b*, and the third electrode 5300 may be configured as shown in FIG. 18*a* or the second electrode 5200 and the third electrode 5300 may be also configured and arranged as shown in FIG. 18*b*. Here, when the object like the user's finger approaches the first electrode 5100 and the second electrode 5200, the finger functions as a ground and the touch position can be detected by the change of the mutual capacitance between the first electrode 5100 and the second electrode 5200. Also, when a pressure is applied to the touch screen 130 by the object, a distance "d" between the second electrode 5200 and the third electrode 5300 is changed, so that the touch pressure can be detected by the change of the mutual capacitance between the second electrode 5200 and the third electrode 5300. Also, according to the embodiment, when the object like the user's finger approaches the first electrode 5100 and the second electrode 5200, the finger functions as a ground, so that the touch position can be detected by the change of the self-capacitance of each of the first and second electrodes 5100 and 5200.

Figure 14K:
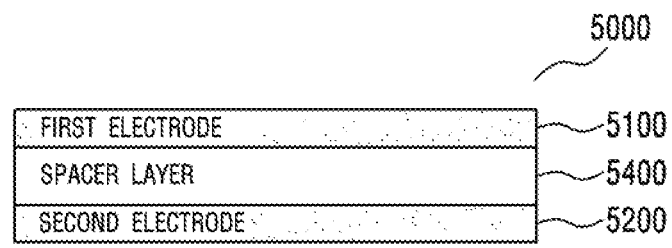

As shown in FIG. 14*k*, the touch position-pressure sensing module 5000 according to the embodiment may include the first electrode 5100 formed in one layer, the spacer layer 5400 formed under the layer in which the first electrode 5100 has been formed, and the second electrode 5200 formed under the spacer layer 5400.

Here, the first electrode 5100 and the second electrode 5200 may be configured and arranged as shown in FIG. 18*b*. Here, the touch position can be detected by the change of the mutual capacitance between the first electrode 5100 and the second electrode 5200. Also, when a pressure is applied to the touch screen 130 by the object, a distance "d" between the first electrode 5100 and the second electrode 5200 is changed, so that the touch pressure can be detected by the change of the mutual capacitance between the first electrode 5100 and the second electrode 5200. The first electrode 5100 and the second electrode 5200 may be configured and arranged as shown in FIG. 18*a*. Here, when the object like the user's finger approaches the first electrode 5100, the finger functions as a ground and the self-capacitance of the first electrode 5100 is changed, so that the touch position can be detected. Also, the touch pressure can be detected by the change of the mutual capacitance between the first electrode 5100 and the second electrode 5200.

Figure 15:
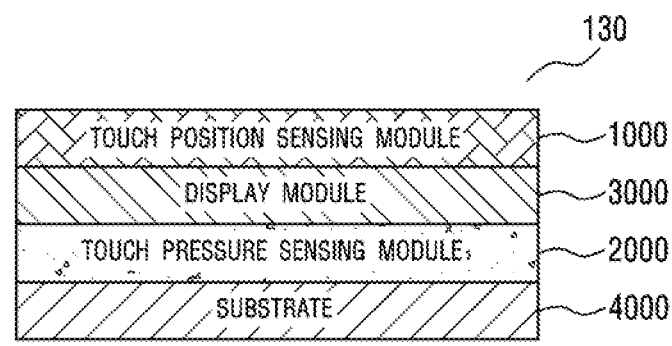
FIG. 15 shows a structure of the touch screen according to the third embodiment.

As shown in FIG. 15, a touch screen 130 according to a third embodiment may include the touch position sensing module 1000, the display module 3000 disposed under the touch position sensing module 1000, the touch pressure sensing module 2000 disposed under the display module 3000, and the substrate 4000 disposed under the touch pressure sensing module 2000.

In the touch screens 130 according to the embodiment shown in FIGS. 10 and 13, since the touch pressure sensing module 2000 which includes the spacer layer 2400 or the touch position-pressure sensing module 5000 which includes the spacer layer 5400 is disposed on the display module 3000, the color clarity, visibility, optical transmittance of the display module 3000 may be reduced. Therefore, in order to prevent such problems, the touch position sensing module 1000 and the display module 3000 are fully laminated by using an adhesive like an optically clear adhesive (OCA), and the touch pressure sensing module 2000 is disposed under the display module 3000. As a result, the aforementioned problem can be alleviated and solved. Also, an existing gap formed between the display module 3000 and the substrate 4000 is used as the spacer layer for detecting the touch pressure, so that the overall thickness of the touch screen 130 can be reduced.

The touch position sensing module 1000 according to the embodiment shown in FIG. 15 is the same as the touch position sensing module shown in FIGS. 11*a* to 11*d*.

Figure 16A:
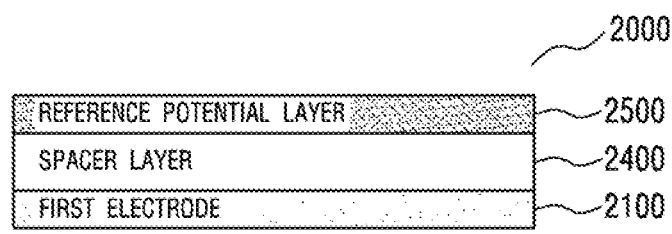
FIGS. 16a to 16b show a structure of a touch pressure sensing module of the touch screen according to the third embodiment.
Figure 16B:
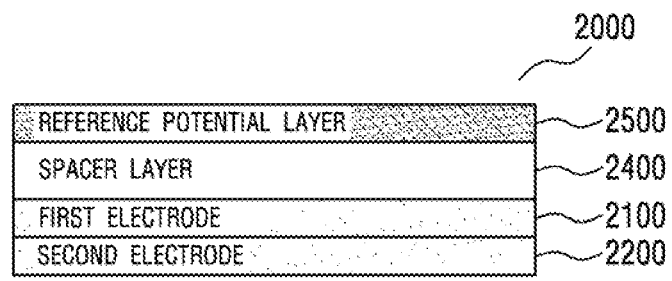

The touch pressure sensing module 2000 according to the embodiment shown in FIG. 15 may be the touch pressure sensing module shown in FIGS. 12*a* to 12*f* and the touch pressure sensing module shown in FIGS. 16*a* to 16*b*.

As shown in FIG. 16*a*, the touch pressure sensing module 2000 according to the embodiment may include the reference potential layer 2500, the spacer layer 2400 formed under the reference potential layer 2500, and the first electrode 2100 formed under the spacer layer 2400. Since the configuration aid operation of FIG. 16*a* are the same as those of FIGS. 12*a* and 12*b* with the exception of the fact that the position of the reference potential layer 2500 and the position of the first electrode 2100 are replaced with each other, repetitive descriptions thereof will be omitted hereafter.

As shown in FIG. 16*b*, the touch pressure sensing module 2000 according to the embodiment may include the reference potential layer 2500, the spacer layer 2400 formed under the ground, the first electrode 2100 formed in a layer under the spacer layer 2400, and the second electrode 2200 formed in a layer under the layer in which the first electrode 2100 has been formed. Since the configuration and operation of FIG. 16*b* are the same as those of FIGS. 12*c* and 12*d* with the exception of the fact that the position of the reference potential layer 2500, the position of the first electrode 2100 and the position of the second electrode 2200 are replaced with each other, repetitive descriptions thereof will be omitted hereafter. Here, even when the first electrode 2100 and the second electrode 2200 are formed in the same layer, the touch pressure can be detected as described in FIGS. 12*c* and 12*d*.

Although it has been described in FIG. 15 that the display module 3000 is disposed under the touch position sensing module 1000, the touch position sensing module 1000 can be included within the display module 3000. Also, although it has been described in FIG. 15 that the touch pressure sensing module 2000 is disposed under the display module 3000, a portion of the touch pressure sensing module 2000 can be included within the display module 3000. Specifically, the reference potential layer 2500 of the touch pressure sensing module 2000 may be disposed within the display module 3000, and the electrodes 2100 and 2200 may be formed under the display module 3000. As such, when the reference potential layer 2500 is disposed within the display module 3000, a gap formed within the display module 3000 is used as the spacer layer for detecting the touch pressure, so that the overall thickness of the touch screen 130 can be reduced. Here, the electrodes 2100 and 2200 may be formed on the substrate 4000. As such, when the electrodes 2100 and 2200 are formed on the substrate 4000, not only the gap formed within the display module 3000 but also the gap formed between the display module 3000 and the substrate 4000 is used as the spacer layer for detecting the touch pressure, so that the sensitivity for detecting foe touch pressure can be more improved.

Figure 17A:
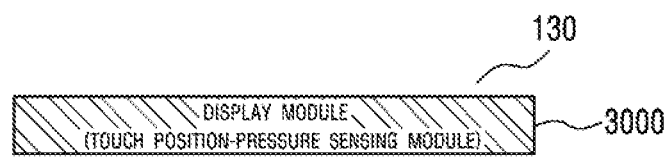
FIG. 17a shows a structure of the touch screen according to a fourth embodiment.

FIG. 17a shows a structure of the touch screen according to a fourth embodiment. As shown in FIG. 17a, the touch screen 130 according to the fourth embodiment may include at least one of the touch position sensing module and the touch pressure sensing module within the display module 3000.

Figure 17B:
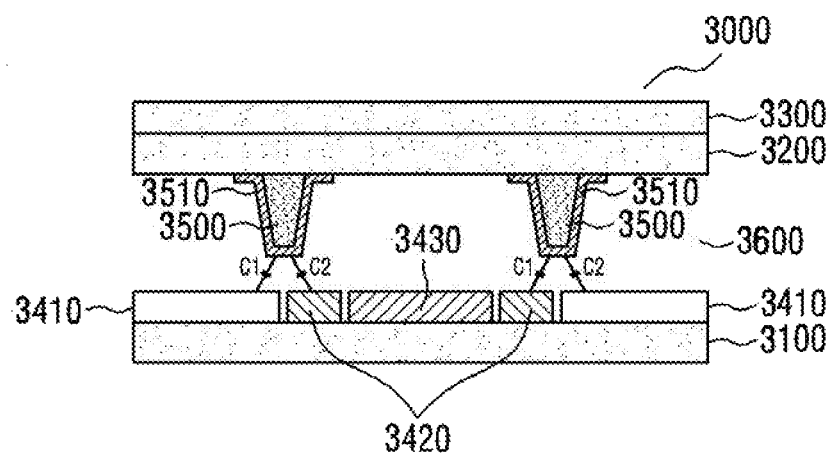
FIGS. 17b and 17c are structure views of touch pressure sensing and touch position sensing of the touch screen according to the fourth embodiment.
Figure 17C:
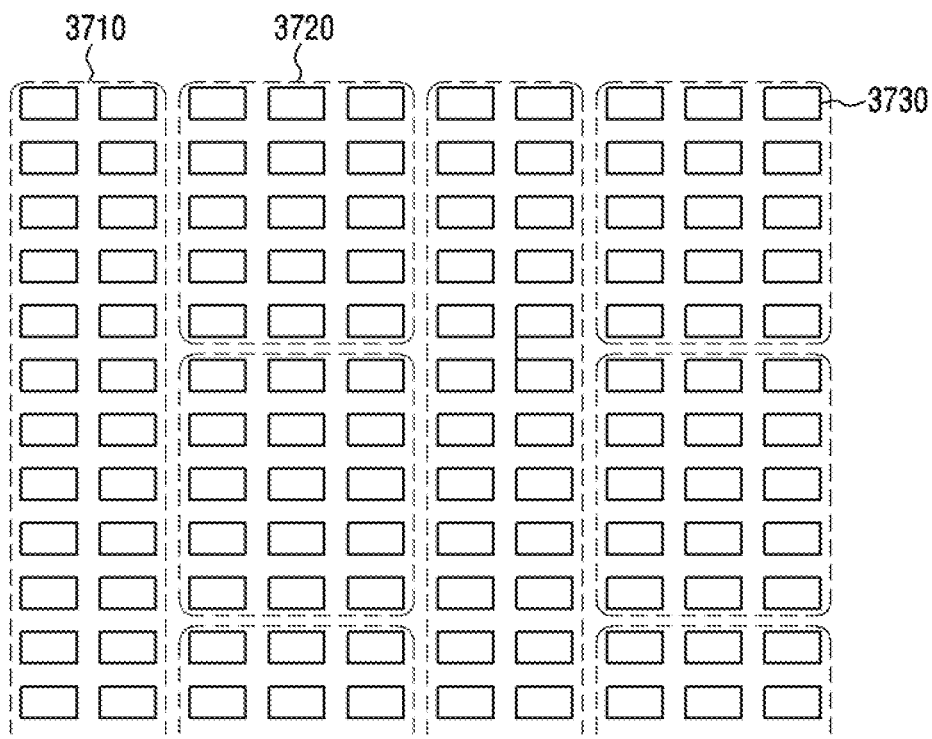

FIGS. 17b and 17c are structure views of touch pressure sensing and touch position sensing of the touch screen according to the fourth embodiment. FIGS. 17b and 17c take an LCD panel as an example of the display module 3000.

In case of the LCD panel, the display module 3000 may include a TFT layer 3100 and a color filter layer 3300. The TFT layer 3100 includes a TFT substrate layer 3110 disposed directly thereon. The color filter layer 3300 includes a color filter substrate layer 3200 disposed directly thereunder. The display module 3000 includes a liquid crystal layer 3600 between the TFT layer 3100 and the color filter layer 3300. Here, the TFT substrate layer 3110 includes electrical components necessary to generate an electric field driving the liquid crystal layer 3600. Particularly, the TFT substrate layer 3110 may be comprised of various layers including a data line, a gate line, TFT, a common electrode, a pixel electrode and the like. These electrical components generate a controlled electric field and orient the liquid crystals in the liquid crystal layer 3600.

As shown in FIG. 17b, the display module 3000 according to the embodiment of the present invention may include sub-photo spacers 3500 disposed on the color filter substrate layer 3200. These sub-photo spacers 3500 may be disposed on the interface between the low common electrode 3410 and the adjacent guard shield electrode 3420. Here, a conductive material layer 3510 like ITO may be patterned on the sub-photo spacer 3500. Here, a fringing capacitance C1 is formed between the low common electrode 3410 and the conductive material layer 3510, and a fringing capacitance C2 is formed between the guard shield electrode 3420 and the conductive material layer 3510.

When the display module 3000 shown in FIG. 17b functions as the touch pressure sensing module, a distance between the sub-photo spacers 3500 and the TFT substrate layer 3110 may be reduced by an external pressure, and thus, a capacitance between the low common electrode 3410 and the guard shield electrode 3420 may be reduced. Accordingly, in FIG. 17b, the conductive material layer 3510 functions as the reference potential layer and detects the change of the capacitance between the low common electrode 3410 and the guard shield electrode 3420, so that the touch pressure can be detected.

FIG. 17c shows a structure in which the LCD panel as the display module 3000 is used as the touch position sensing module. The arrangement of the common electrodes 3730 is shown in FIG. 17c. Here, for the purpose of detecting the touch position, these common electrodes 3730 may be divided into a first area 3710 and a second area 3720. Accordingly, for example, the common electrodes 3730 included in one first area 3710 may be operated in such a manner as to function in response to the first electrode 6400 of FIG. 18c, and the common electrodes 3730 included in one second area 3720 may be operated in such a manner as to function in response to the second electrode 6500 of FIG. 18c. That is, in order that the common electrodes 3730, i.e., electrical components for driving the LCD panel are used to detect the touch position, the common electrodes 3730 may be grouped. Such a grouping can be accomplished by a structural configuration and manipulation of operation.

As described above, in FIG. 17, the electrical components of the display module 3000 are caused to operate in conformity with their original purpose, so that the display module 3000 performs its own function. Also, at least some of the electrical components of the display module 3000 are caused to operate for detecting the touch pressure, so that the display module 3000 functions as the touch pressure sensing module. Also, at least some of the electrical components of the display module 3000 are caused to operate for detecting the touch position, so that the display module 3000 functions as the touch position sensing module. Here, each operation mode may be performed in a time-division manner. In other words, the display module 3000 may function as the display module in a first time interval, as the pressure sensing module in a second time interval, and/or as the position sensing module in a third time interval.

FIGS. 17b and 17c only show the structures for the detection of the touch pressure and the touch position respectively for convenience of description. So long as the display module 3000 can be used to detect the touch pressure and/or the touch position by operating the electrical components for the display operation of the display module 3000, the display module 3000 can be included in the fourth embodiment.

FIG. 1 is a structure view of the touch input device 100 according to the embodiment. Referring to FIG. 1, the touch input device 100 according to the embodiment of the present invention may include a controller 110, the touch screen 130, and a processor 140.

An input to the touch input device 100 may be performed by the touch on the touch screen 130. The touch input device 100 according to the embodiment of the present invention may be a portable electronic device like a laptop computer, a personal digital assistant (PDA), and a smart phone. Also, the touch input device 100 according to the embodiment of the present invention may be a non-portable electronic device like a desktop computer and a smart television.

The touch screen 130 according to the embodiment of the present invention allows a user to operate a computing system by touching the screen with an object like a finger. In general, the touch screen 130 recognizes the touch on the panel and the computing system analyzes the touch and performs operations in accordance with the analysis.

As shown in FIG. 1, the processor 140 according to the embodiment can detect the touch position when the touch occurs on the touch screen 130. Also, the processor 140 can measure the amount of the capacitance change occurring according to the touch when the touch occurs on the touch screen 130.

The touch input device 100 according to the embodiment may operate in a first drive mode and a second drive mode. The touch input device 100 according to the embodiment may be operated by setting any one of the first and second drive modes as a default drive mode. For example, the touch input device 100 according to the embodiment may be operated by setting the second drive mode as the default drive mode.

In the second drive mode, the touch input device 100 according to the embodiment is touched by a touch object like a conductor and may be operated in an environment in which the capacitance change easily occurs due to the object. In the second drive mode, the touch input device 100 according to the embodiment, for example, a two-dimensional position of the touch by the touch object may be detected by a method in which the processor 140 generally detects the touch position.

In the first drive mode, the touch input device 100 according to the embodiment can be operated underwater. For instance, when the touch input device 100 according to the embodiment is touched underwater by the touch object, the change of the mutual capacitance (Cm) due to the object that just touches may not be constant or may be difficult to occur. In the first drive mode, when the object touches the touch screen 130, the amount of the capacitance change which is caused by the touch pressure is detected, thereby detecting the touch position.

Therefore, the user is allowed to operate the touch input device 100 underwater by selecting the first drive mode. The controller 110 of the touch input device 100 according to the embodiment can perform the first drive mode or the second drive mode by selective input to the touch input device 100. For example, the touch input device 100 may be implemented to have a physical switch or button, etc., allowing the user to select the first drive mode and the second drive mode according to needs. Otherwise, an option for selecting the first drive mode and the second drive mode is displayed on the touch screen 130 included in the touch input device 100 of the present invention, so that the first drive mode and the second drive mode may be performed according to the user's selective input.

Hereafter, a common method for detecting the position of the touch (position on a two-dimensional plane) in the second drive mode will be described first, and then a method for detecting the position of the touch in the first drive mode by detecting the capacitance change according to the touch pressure will be described.

Through the touch position sensing module 1000 or the touch position-pressure sensing module 5000 of the touch screen 130, the processor 140 can measure a capacitance change amount according to the approach of an object 10 to the touch screen 130 and can calculate the touch position from the measured capacitance change amount. Also, the processor 140 according to the embodiment can calculate the aforementioned touch position through the display module 3000 capable of detecting the touch position/touch pressure of the touch screen 130.

As described with reference to FIGS. 10 to 18, the modules 1000, 3000 and 5000 that sense the touch position of the touch screen 130 may include a plurality of drive electrodes TX1 to TXn and a plurality of receiving electrodes RX1 to RXm. The plurality of drive electrodes TX1 to TXn and the plurality of receiving electrodes RX1 to RXm may form an orthogonal array. However, the present invention is not limited to this. The plurality of drive electrodes TX1 to TXn and the plurality of receiving electrodes RX1 to RXm has an array of arbitrary dimension, for example, a diagonal array, a concentric array, a 3-dimensional random array, etc., and an array obtained by the application of them. Here, "n" and "m" are positive integers and may be the same as each other or may have different values. The magnitude of the value may be changed depending on the embodiment.

The plurality of drive electrodes TX1 to TXn and the plurality of receiving electrodes RX1 to RXm may be arranged to cross each other. The drive electrode TX may include the plurality of drive electrodes TX1 to TXn extending in a first axial direction. The receiving electrode RX may include the plurality of receiving electrodes RX1 to RXm extending in a second axial direction crossing the first axial direction.

The plurality of drive electrodes TX1 to TXn and the plurality of receiving electrodes RX1 to RXm according to the embodiment may be formed in the same layer. For example, the plurality of drive electrodes TX1 to TXn and the plurality of receiving electrodes RX1 to RXm may be formed on the same side of an insulation layer (not shown). Also, the plurality of drive electrodes TX1 to TXn and the plurality of receiving electrodes RX1 to RXm may be formed in the different layers. For example, the plurality of drive electrodes TX1 to TXn and the plurality of receiving electrodes RX1 to RXm may be formed on both sides of one insulation layer (not shown) respectively, or the plurality of drive electrodes TX1 to TXn may be formed on a side of a first insulation layer (not shown) and the plurality of receiving electrodes RX1 to RXm may be formed on a side of a second insulation layer (not shown) different from the first insulation layer.

The plurality of drive electrodes TX1 to TXn and the plurality of receiving electrodes RX1 to RXm may be made of a transparent conductive material (for example, indium tin oxide (ITO) or antimony tin oxide (ATO). However, this is just an example. The drive electrode TX and the receiving electrode RX may be also made of another transparent conductive material or an opaque conductive material like copper, etc.

As described above, a capacitance (C) with a predetermined value is generated at each crossing of the drive electrode TX and the receiving electrode RX. In the second drive mode, when a conductive object like a finger approaches close to the touch screen 130, the value of the capacitance may be changed. The processor 140 senses such electrical characteristics, thereby being able to sense whether or not the touch has occurred and/or where the touch has occurred on the touch screen 130. For example, the processor 140 is able to sense whether or not the touch has occurred and/or where the touch has occurred on the touch screen 130 on a two-dimensional plane consisting of a first axis and a second axis.

More specifically, when the touch occurs on the touch screen 130, the drive electrode TX to which the driving signal has been applied is detected, so that the position of the second axial direction of the touch can be detected. Likewise, when the touch occurs on the touch screen 130, the capacitance change is detected on the reception signal received through the receiving electrode RX, so that the position of the first axial direction of the touch can be detected.

The foregoing has described an example in which whether or not the touch has occurred on the touch screen 130 according to the embodiment and/or where the touch has occurred are detected by the second drive mode.

The method for detecting the touch position is generally performed by measuring the mutual capacitance (Cm) change amount due to foe touch on foe touch screen 130 by the object like a conductor.

Hereafter, a camera reset process according to the embodiment of the present invention will be described with reference to FIGS. 2a to 2d and 3a to 3d.

Figure 2A:
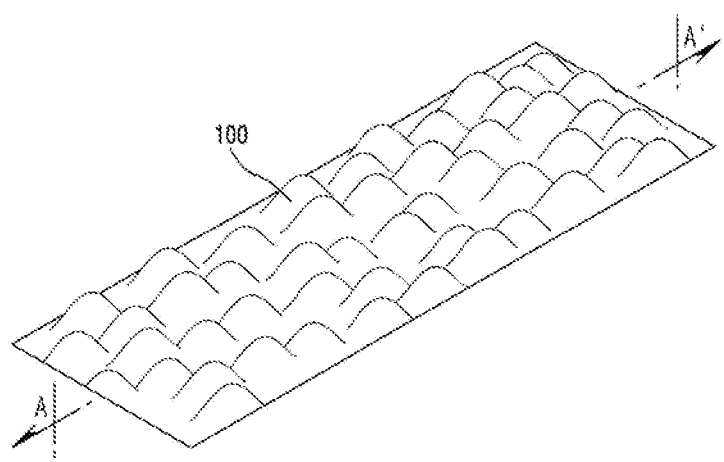
FIGS. 2a to 2d show a capacitance change amount that is detected on a touch screen in a general environment.
Figure 2B:
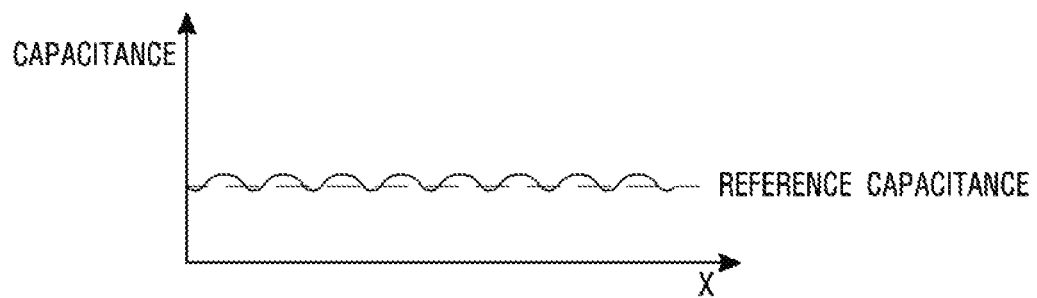
Figure 2C:
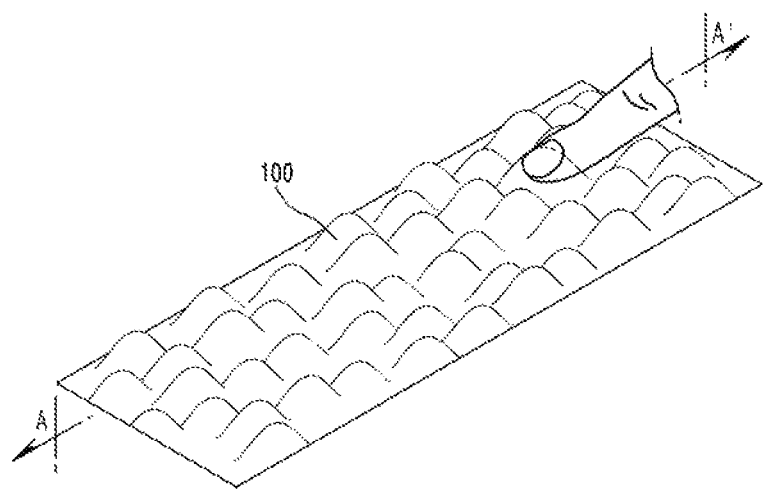
Figure 2D:
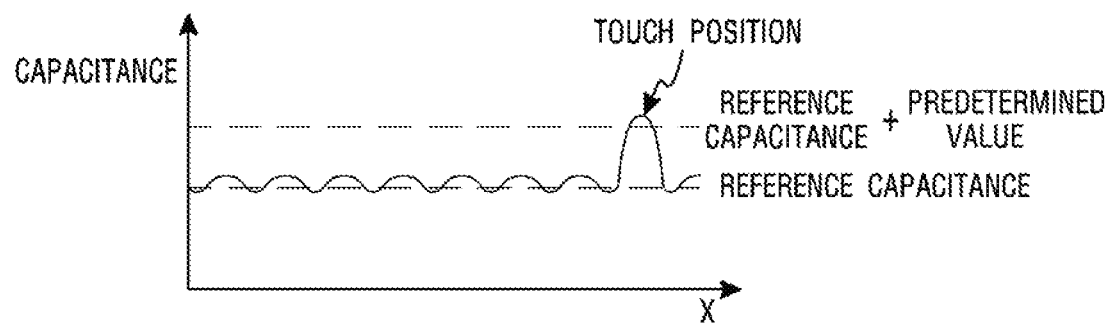
Figure 3A:
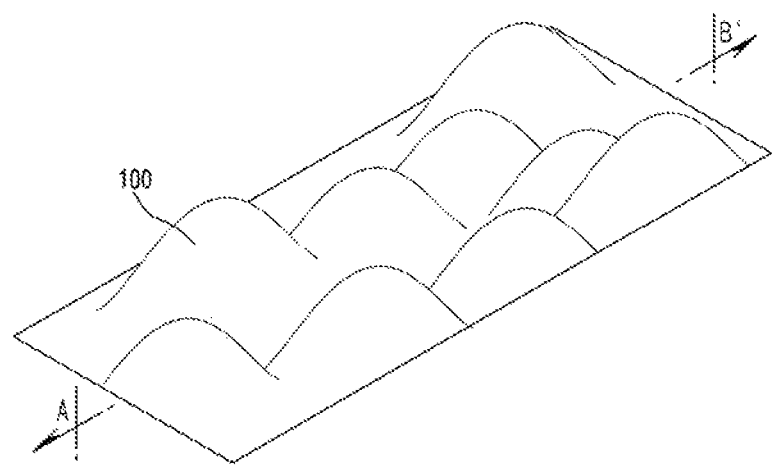
FIGS. 3a to 3f show the capacitance change amount that is detected on the touch screen underwater.
Figure 3B:
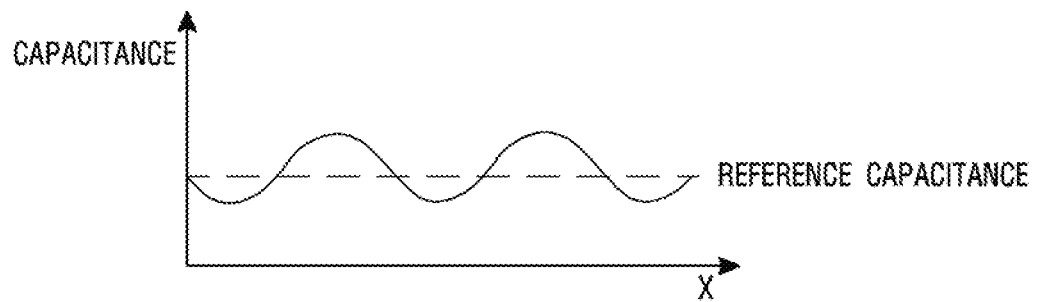
Figure 3C:
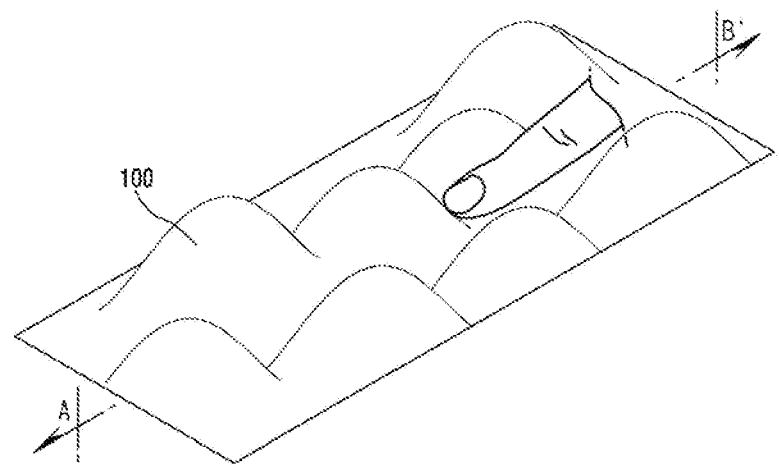
Figure 3D:
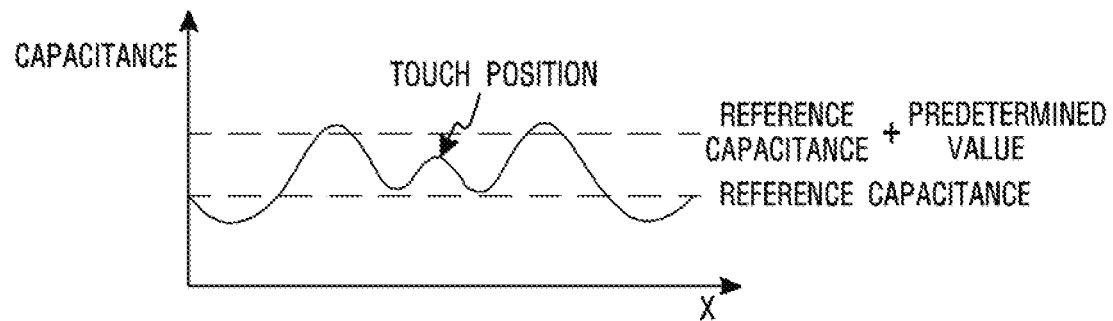
Figure 3E:
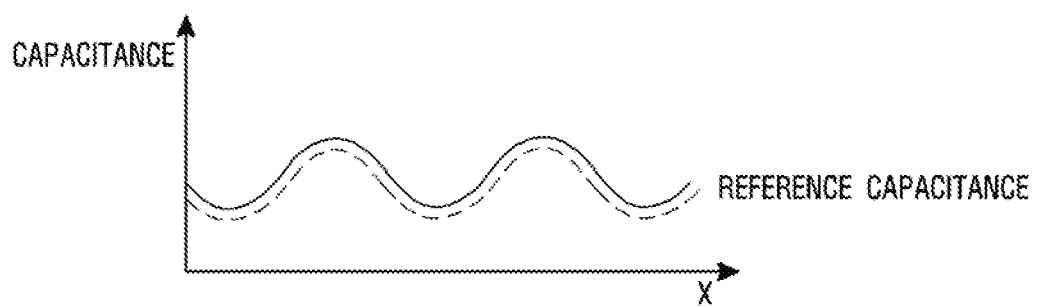
Figure 3F:
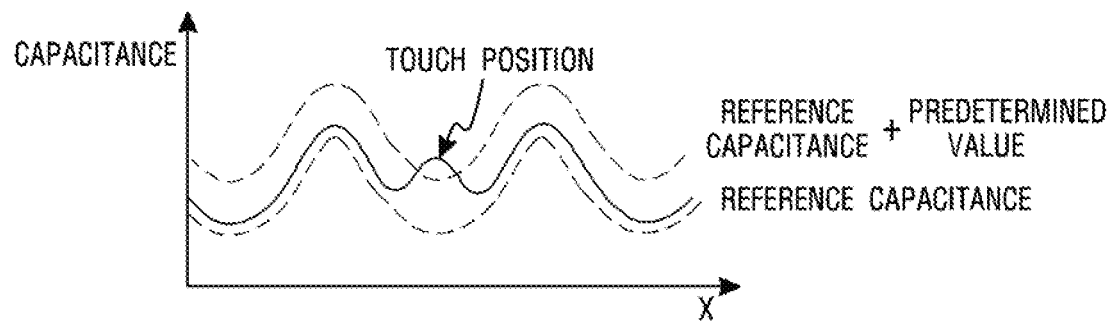

FIG. 2a is a perspective view showing a capacitance detected on the touch screen 130 in a general environment when no touch occurs on the touch screen 130. FIG. 2b is a graph showing the capacitance detected on a line A-A' of FIG. 2a. FIG. 2c is a perspective view showing a capacitance detected on the touch screen 130 in a general environment when the touch occurs on the touch screen 130. FIG. 2d is a graph showing the capacitance detected on a line A-A' of FIG. 2c. FIG. 3a is a perspective view showing a capacitance detected on the touch screen 130 underwater when no touch occurs on the touch screen 130. FIG. 3b is a graph showing the capacitance detected on a line B-B' of FIG. 3a. FIG. 3c is a perspective view showing a capacitance detected on the touch screen 130 underwater when the touch occurs on the touch screen 130. FIG. 3d is a graph showing the capacitance detected on a line B-B' of FIG. 3c. FIG. 3e is a graph showing the capacitance detected on the line B-B' of FIG. 3a after the reset process is performed. FIG. 3f is a graph showing the capacitance detected on the line B-B' of FIG. 3c after the reset process is performed.

The pattern of the capacitance detected on the touch screen 130 underwater appears differently from the pattern of the capacitance detected on the touch screen 130 in a general environment. Specifically, as shown in FIGS. 2a and 2b, when no touch occurs on the touch screen 130, the capacitance detected on the touch screen 130 in a general environment has a value within a relatively small error range based on the reference capacitance in accordance with the position within the touch screen 130. Therefore, as shown in FIGS. 2c and 2d, the touch occurring on the touch screen 130 causes the capacitance change amount of more than a predetermined value on the basis of the reference capacitance, so that it is recognized that the touch has been input to the corresponding position. Contrarily, as shown in FIGS. 3a and 3b, when no touch occurs on the touch screen 130, the capacitance detected on the touch screen 130 underwater has a value within a relatively large error range based on the reference capacitance in accordance with the position within the touch screen 130. Therefore, when the touch, is recognized underwater on the basis of the reference capacitance of the general environment, as shown in FIGS. 3c and 3d, even though the touch is input to the touch screen 130, the capacitance change amount of more than a predetermined value on the basis of the reference capacitance is not caused, or even though the touch is not input to the touch screen 130, the capacitance change amount of more than a predetermined value on the basis of the reference capacitance is caused, so that an error in the recognition of the touch position occurs.

Therefore, the reset process is required underwater, which changes the reference capacitance for determining whether the touch is input or not. Specifically, as shown in FIGS. 3e and 3f, in a case where the reference capacitance is changed according to each position within the touch screen 130 in accordance with the capacitance pattern which appears when no touch occurs on the touch screen 130, the capacitance change amount is calculated based on the reference capacitance set according to the each position even though the touch is input underwater to the touch screen 130. Therefore, it is recognized that the touch has been input to the corresponding position.

Also, as shown in FIGS. 3a and 3b, when no touch occurs on the touch screen 130, the pattern of the capacitance detected on the touch screen 130 underwater may be changed depending on time. Therefore, the reset process may be caused to be performed repeatedly at a predetermined cycle. Otherwise, the pattern of the capacitance is detected at a predetermined cycle and when an error between the detected pattern of the capacitance and the previously detected pattern of the capacitance is larger than a predetermined value, the reset process may be performed.

However, also in this case, there occurs a problem that it is not possible to clearly detect the position of the touch on the touch input device 100 by the above-described method.

In the underwater operation of the touch input device 100, the mutual capacitance (Cm) due to the object that just touches the touch input device 100 is not changed. When the touch input device 100 is operated underwater, water contacts the touch input device 100. Since the water is a conductor, the touch input device 100 recognizes as if the countless touches have been input to the touch screen 130. Therefore, even though the touch is input underwater to tire touch screen 130, the mutual capacitance is not changed.

Therefore, it is intended to provide the embodiment-based touch input device 100 capable of detecting underwater whether or not the touch occurs on the touch screen 130 and where the touch has occurred.

Hereafter, described is a principle of detecting the touch position in the first drive mode by measuring the capacitance change caused by the magnitude of the touch pressure when the touch occurs on the touch screen 130 of the touch input device 100 according to the embodiment.

Also, the size of the capacitance change amount may be changed according to the touch pressure when the touch occurs. Therefore, when the touch occurs on the touch screen 130, the processor 140 can measure the size of the capacitance change amount according to the touch pressure. Here, the less the touch pressure becomes, the less the capacitance change amount becomes, and the greater the touch pressure becomes, the greater the capacitance change amount becomes.

Specifically, the processor 140 may measure the capacitance change amount caused by the pressure which is applied from the object 10 to the touch screen 130 through the touch pressure sensing module 2000, the touch position-pressure sensing module 5000 or the display module 3000 of the touch screen 130, which is capable of detecting the touch pressure, and may calculate the magnitude of the touch pressure from the measured capacitance change amount.

Figure 4:
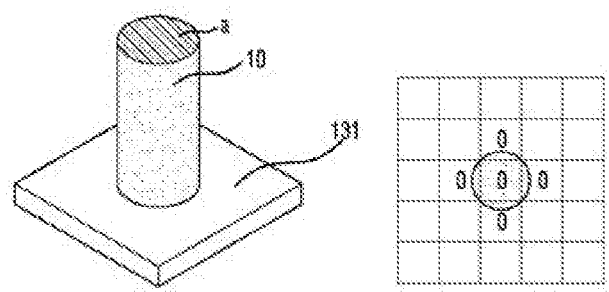
FIGS. 4 and 5 are views for describing the capacitance change amount due to a pressure.
Figure 5:
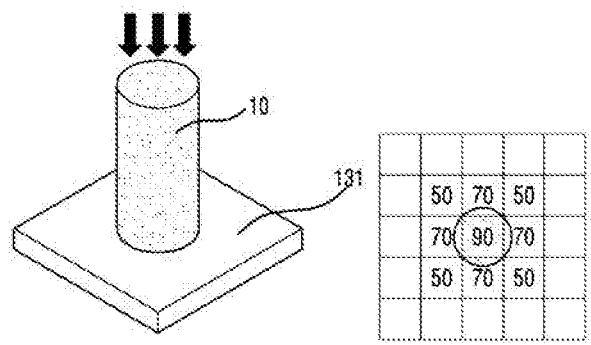

FIGS. 4 and 5 are views for describing the capacitance change amount due to the pressure. The processor 140 according to the embodiment is able to calculate the position of the touch on the touch screen 130 on the basis of the capacitance change amount.

Specifically, the processor 140 is able to calculate the touch position by the capacitance change amount according to the magnitude of the pressure which is applied to the touch screen 130 by the object 10. For example, as shown in FIG. 4, when the object 10 touches the touch screen 130 without applying the pressure, the capacitance change amount is 0. FIG. 5 shows that the object 10 touches the touch screen 130 while applying the pressure. In this case, the capacitance which is generated from the touch screen 130 is changed and a position where the greatest capacitance change amount is generated is measured, so that the touch position can be calculated.

The measured capacitance change amount and/or at least any one of the touch position and touch pressure magnitude calculated from the measured capacitance change amount is transmitted to the controller 110 by the processor 140. Here, the controller 110 may calculate a touch time period by using the capacitance change amount transmitted from the processor 140. According to the embodiment, the controller 110 may be an application processor. The application processor is able to perform the command interpretation, operation, and control, etc., in the portable electronic device. For example, the controller 110 may be set in such a manner as to recognize the touch as a meaningful touch only when the touch is maintained longer than a predetermined period of time.

Figure 6A:
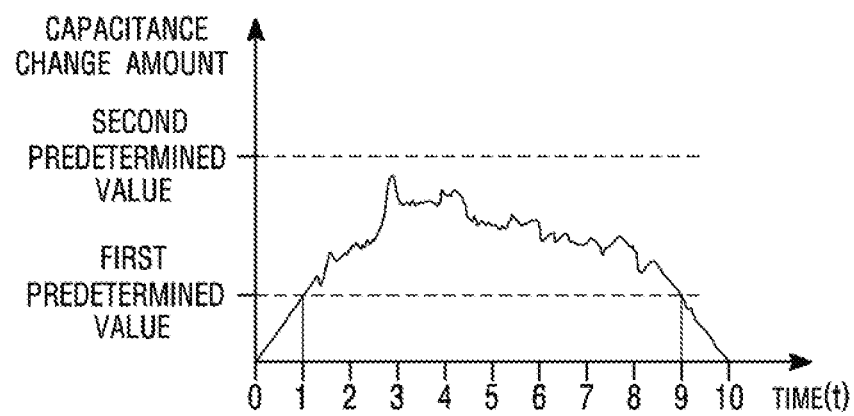
FIGS. 6a and 6b are views for describing a touch time period.
Figure 6B:
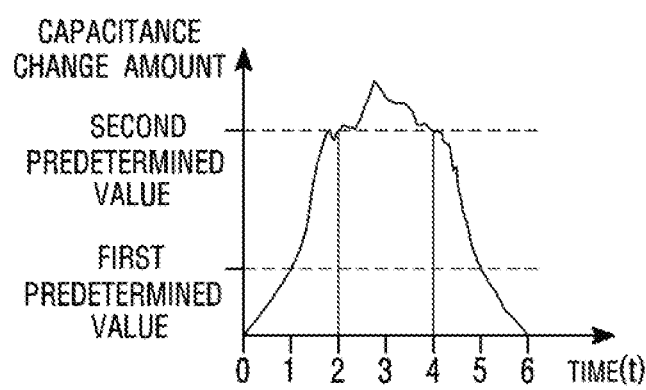

Specifically, the reference value may be set as a first predetermined value or a second predetermined value in accordance with the size of the capacitance change amount, which is required for the touch to be recognized as the meaningful touch according to the embodiment. For example, as shown in FIG. 6*a*, the processor 140 may determine that the object has touched for a time of 8t (1t to 9t) for which the capacitance change amount is maintained greater than the first predetermined value. Also, as shown in FIG. 6*b*, the processor 140 may determine that the object has touched for a time of 2t (2t to 4t) for which the capacitance change amount is maintained greater than the second predetermined value.

The touch input device 100 including the touch screen 130 according to the embodiment of the present invention may further include a memory 120. The memory 130 may store the above-described first predetermined value, the second predetermined value, and/or the maintenance time of the capacitance change amount, which is required for the touch to be recognized as the meaningful touch, and the like. Hereafter, a method for operating the camera underwater in accordance with the embodiment of the present invention will be described with reference to FIGS. 1 and 7 to 9.

Figure 7A:
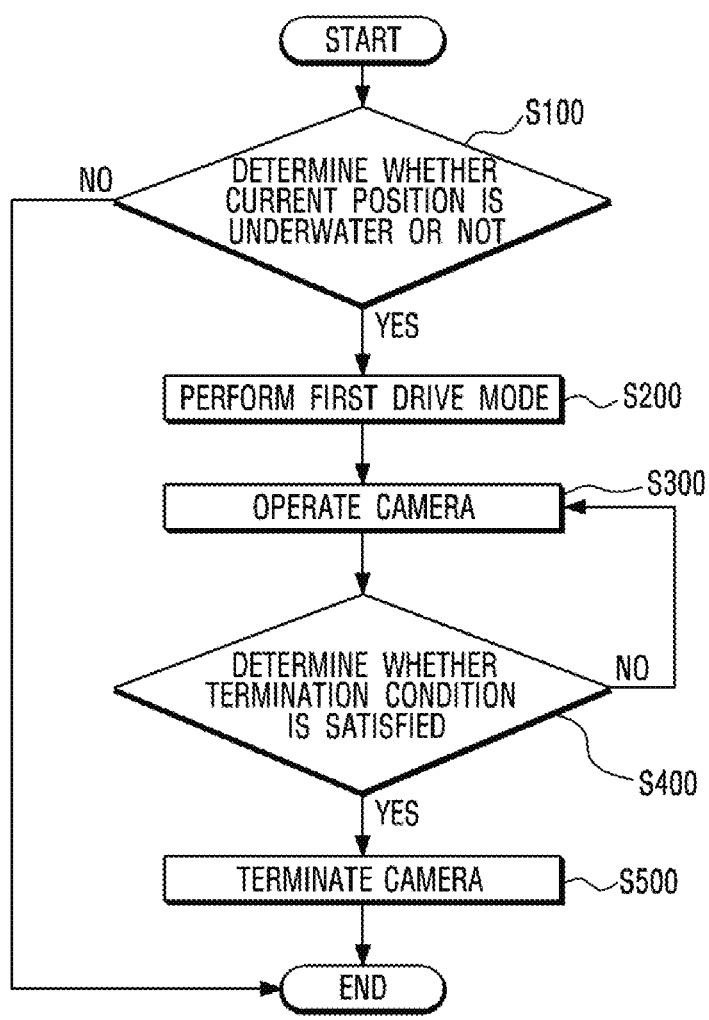
Figure 7B:
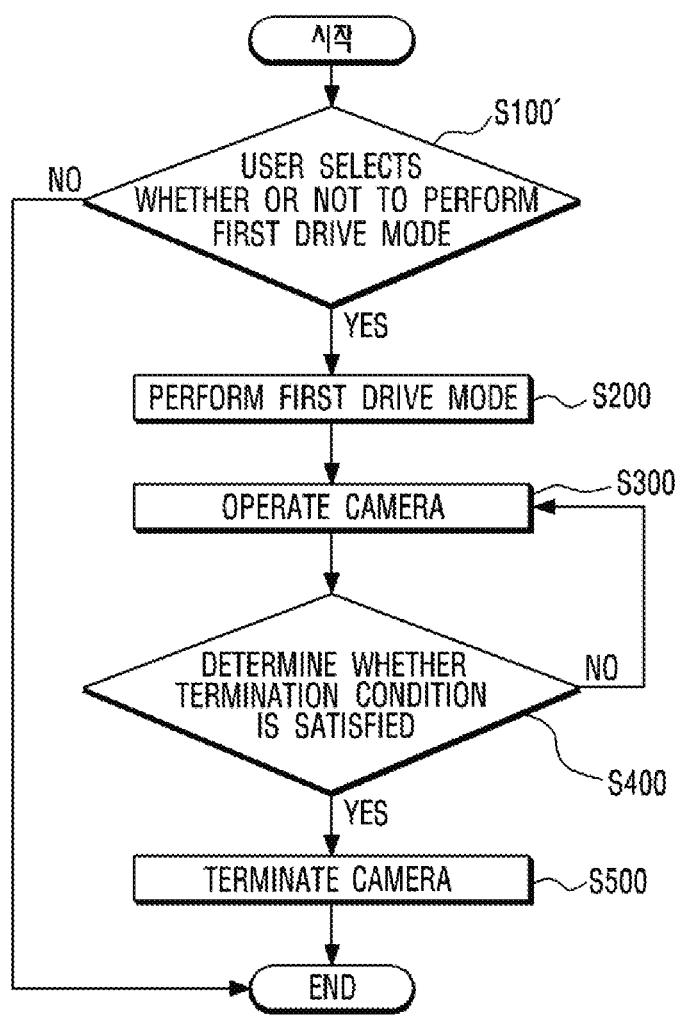
Figure 7C:
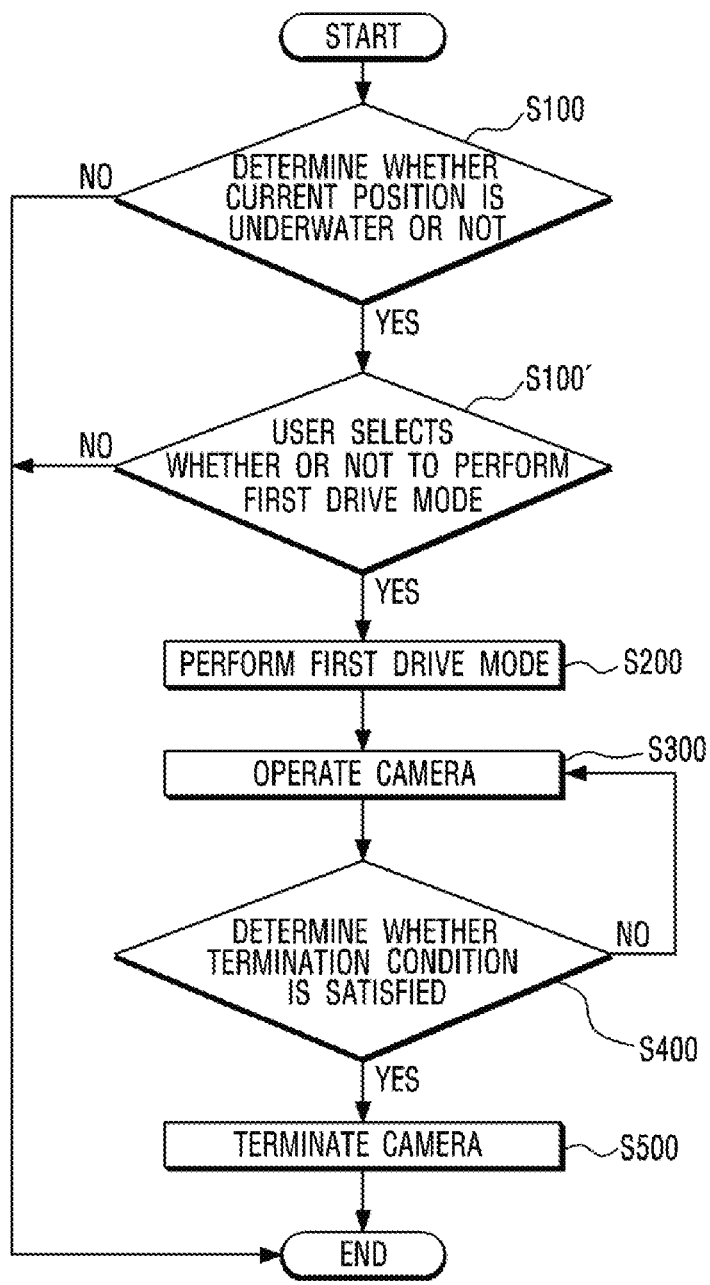

FIGS. 7*a* to 7*c* are flow charts for describing a method for operating the camera underwater in accordance with the embodiment.

First, a case where the touch input device 100 is set to be automatically operated in the first drive mode will be described.

Referring to FIG. 7*a*, the method for operating the camera underwater in accordance with the embodiment may include determining whether the current position of the camera is underwater or not (S100), performing the first drive mode (S200), operating the camera underwater (S300), determining whether or not a termination condition of the camera is satisfied (S400), and terminating the camera (S500).

The controller 110 determines whether the current position of the camera is underwater or not (S100). Specifically, the touch screen 130 contacting the water determines that the touch is input by the water. Therefore, the touch screen 130 may malfunction unintentionally due to the touch input by the water. When the condition currently input to the touch screen 130 satisfies a predetermined condition, the controller 110 may determine that the current position is underwater. Here, the predetermined condition may be that the touches whose number is larger than the predetermined number are maintained for a period of time longer than a predetermined period of time or may be, as shown in FIGS. 3*a* and 3*b*, that the pattern of the capacitance detected on the touch screen 130 has an error range larger than a predetermined value.

When it is determined that the current position is not underwater, the subsequent processes are not performed.

On the other hand, when it is determined that the current position is underwater, the first drive mode is performed (S200). Here, when the first drive mode is performed, the reset process which changes the reference capacitance for determining whether the touch is input or not is performed in order to recognize the state where the capacitance is changed by the contact with water as the state where no touch occurs, and the touch position can be detected by the touch pressure.

As such, in the case where the current position is underwater as a result of determining whether the current position is underwater or not, when the reset process is automatically performed in such a manner as to detect the touch position underwater by the touch pressure, the user is able to use the terminal underwater without a separate operation.

A case where the touch input device 100 is set to be manually operated in the first drive mode will be described.

Referring to FIG. 7*b*, the method for operating the camera underwater in accordance with the embodiment may include selecting whether or not to perform the first drive mode (S100'), performing the first drive mode (S200), operating the camera underwater (S300), determining whether or not a termination condition of the camera is satisfied (S400), and terminating the camera (S500).

The controller 110 allows the user to select whether the first drive mode is performed or not (S100'). Specifically, the controller 110 may display an option for selecting the first drive mode and the second drive mode on the touch screen. Here, the user may select the first drive mode.

When the user selects the first drive mode, the first drive mode is performed (S200). Here, when the first drive mode is performed, the reset process which changes the reference capacitance for determining whether the touch is input or not is performed in order to recognize the state where the capacitance is changed by the contact with water as the state where no touch occurs, and the touch position can be detected by the touch pressure.

As such, irrespective of the current position, when the reset process is manually performed in such a manner as to detect the touch position underwater by the touch pressure, the terminal can be set to enable the user himself/herself to use the terminal before the user uses the terminal underwater.

Then, a case where the touch input device 100 is set to be semi-automatically operated in the first drive mode will be described.

Referring to FIG. 7*c*, the method for operating the camera underwater in accordance with the embodiment may include determining whether the current position of the camera is underwater or not (S100), selecting whether or not to perform the first drive mode (S100'), performing the first drive mode (S200), operating the camera underwater (S300), determining whether or not a termination condition of the camera is satisfied (S400), and terminating the camera (S500).

The controller 110 determines whether the current position of the camera is underwater or not (S100). Specifically, the touch screen 130 contacting the water determines that the touch is input by the water. Therefore, the touch screen 130 may malfunction unintentionally due to the touch input by the water. When the condition currently input to the touch screen 130 satisfies a predetermined condition, the controller 110 may determine that the current position is underwater. Here, the predetermined condition may be that the touches whose number is larger than the predetermined number are maintained for a period of time longer than a predetermined period of time or may be, as shown in FIGS. 3*a* and 3*b*, that the pattern of the capacitance detected on the touch screen 130 has an error range larger than a predetermined value.

When it is determined that the current position is not underwater, the subsequent processes are not performed.

On the other hand, when it is determined that the current position is underwater, the controller 110 allows the user to select whether the first drive mode is performed or not (S100'). Specifically, the controller 110 may display an option for selecting the first drive mode and the second drive mode on the touch screen 130. Here, the user may select the first drive mode.

When the user selects the first drive mode, the first drive mode is performed (S200). Here, when the first drive mode is performed, the reset process which changes the reference capacitance for determining whether the touch is input or not is performed in order to recognize the state where the capacitance is changed by the contact with water as the state where no touch occurs, and the touch position can be detected by the touch pressure.

As such, in the case where the current position is underwater as a result of determining whether the current position is underwater or not, when the reset process is manually performed in such a manner as to detect the touch position underwater by the touch pressure, the user is allowed to select underwater whether or not to use the terminal underwater.

FIGS. 8a to 8d show a variety of embodiments of a user interface of the camera which is operated underwater.

The camera is operated underwater (S300). First, the user interface of the camera which is operated underwater may be performed. Specifically, the user interface of the camera which is operated underwater may be performed by touching an icon disposed on the touch screen 130. Also, the user interface of the camera which is operated underwater may be performed by operating a separate physical switch for performing the user interface of the camera which is operated underwater.

Here, the performing the user interface of the camera which is operated underwater is included in the description of the operating the camera underwater (S300), which is subsequent to the determining whether the current position of the camera is underwater or not (S100), the selecting whether or not to perform the first drive mode (S100') and the performing the first drive mode (S200). However, there is no limit to this. The user interlace of the camera which is operated underwater may be performed prior to the determining whether the current position of the camera is underwater or not (S100), the selecting whether or not to perform the first drive mode (S100') or the performing the first drive mode (S200).

Figure 8A:
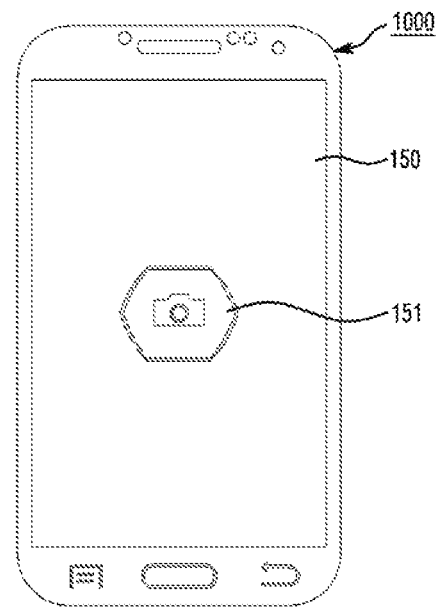
FIGS. 8a to 8d show a variety of embodiments of a user interface of the camera which is operated underwater.

When the user interface of the camera which is operated underwater is performed, a translucent shutter mark 151 making it possible to take a picture or video may be, as shown in FIG. 8a, positioned on the touch screen 130.

Specifically, when the pressure is applied to the central portion of the touch screen 130, the error of the detected touch position is relatively small. On the other hand, when the pressure is applied to the edge of the touch screen 130, the error of the detected touch position is relatively large. Accordingly, the shutter mark 151 may be positioned on the center of the touch screen 130.

Also, since the touch position which is detected by using the touch pressure is more incorrect than the touch position which is detected by the common touch, the size of the mark displayed on the camera may be larger than the size of the mark displayed on a general camera. Therefore, even if the correct position of the touch is not detected, the camera can be operated.

The user is able to take a photograph by touching the shutter mark 151 in the use of the camera.

Figure 8B:
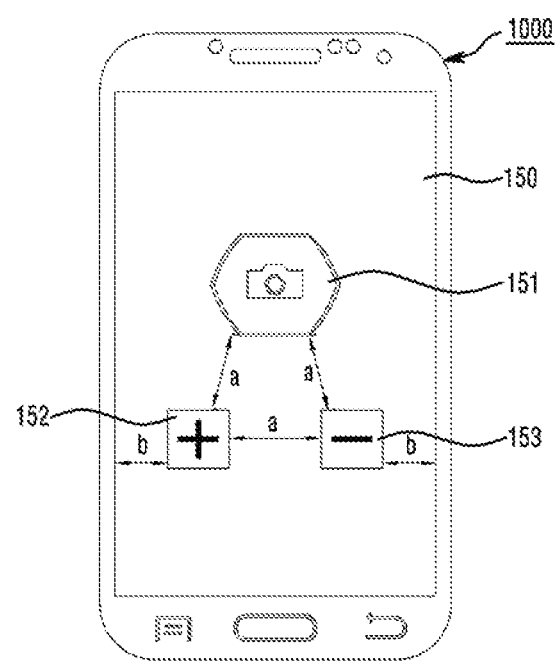

Also, as shown in FIG. 8b, a translucent zoom-in mark 152 and a translucent zoom-out mark 153 may be positioned on the touch screen 130.

For example, in taking a photograph using the camera, the user zooms in or zooms out by using the zoom-in mark 152 or the zoom-out mark 153, and then takes a photograph by touching the shutter mark 151.

Figure 8C:
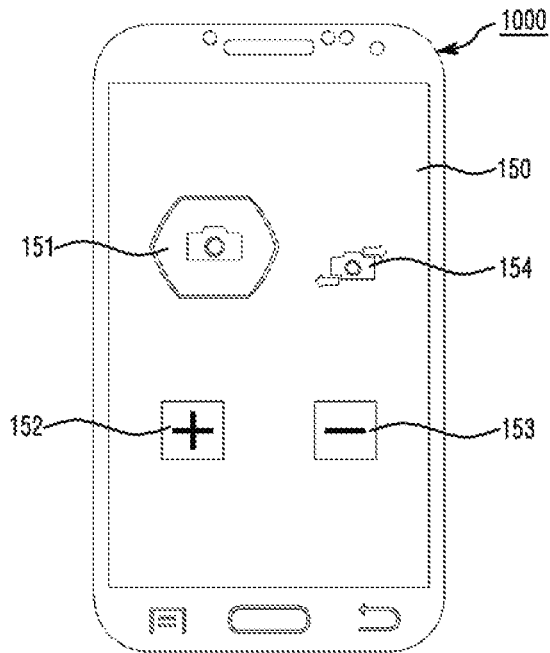

Also, when the touch input device 100 includes a front camera capable of photographing the front of the touch input device 100 and includes a rear camera capable of photographing the rear of the touch input device 100, a translucent switch mark 154 allowing the user to select a front camera mode or a rear camera mode may be, as shown in FIG. 8c, positioned on the touch screen 130.

For example, when the switch mark 154 is touched once, the front camera mode is selected, and thus, it is possible to take photographs for the direction of the user. When the switch mark 154 is touched once again, the rear camera mode is selected, and thus, it is possible to take photographs for the direction in which the user views.

Figure 8D:
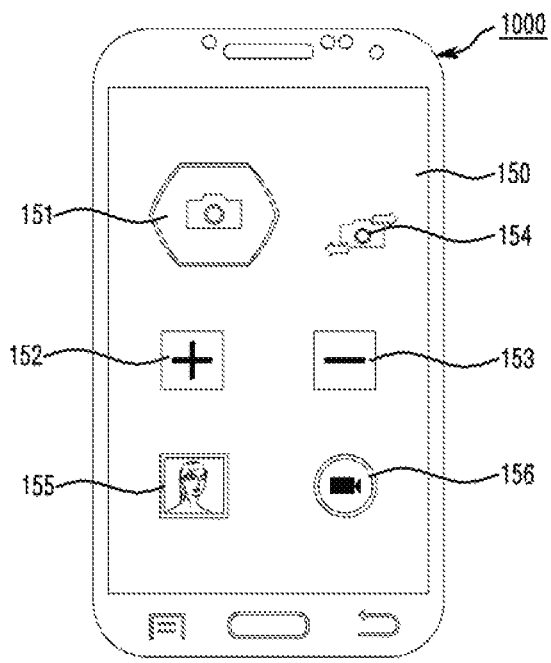

Also, as shown in FIG. 8d, a translucent view mark 155 may be positioned on the touchscreen 130.

Also, a translucent camera mode mark 156 which allows the user to select a picture mode or a video mode may be positioned.

For instance, the user may perform a view mode by touching the view mark 155 to display the photographed picture or video. Also, the user may take videos by touching the camera mode mark 156 once and may take pictures by touching the camera mode mark 156 once again.

Figure 9:
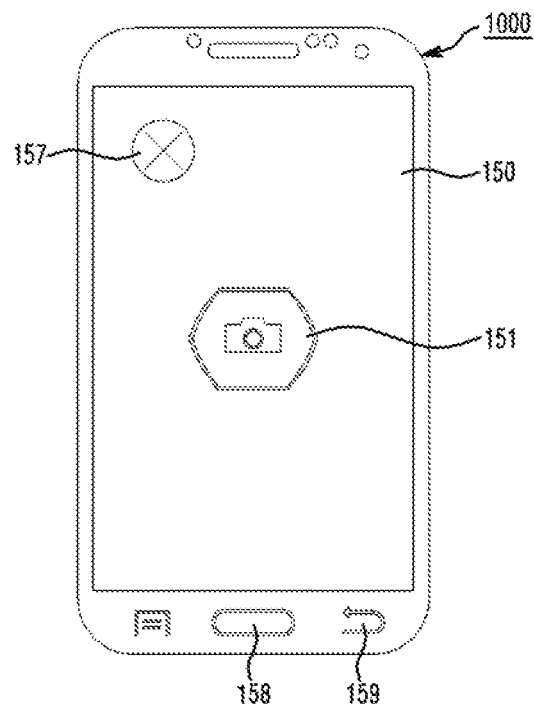
FIG. 9 shows a method for terminating the camera according to the embodiment.

FIG. 9 shows a method for terminating the camera according to the embodiment.

It is determined whether or not the termination condition of the camera is satisfied (S400). Specifically, the controller 110 is able to determine whether or not the termination condition of the camera is satisfied (S400).

The termination condition may be a condition that the touch is input to a termination mark 157. For example, as shown in FIG. 9, the termination mark 157 may be positioned on the touch screen 130. The controller 110 is able to determine whether the translucent termination mark 157 positioned on the touch screen 130 has been touched or not.

Also, the termination condition may be a condition that the touch is not input for a period of time longer than a certain period of time to the user interface of the camera which is operated underwater. For example, the controller 110 is able to determine whether the touch is input or not for a period of time longer than a certain period of time (e.g., 1 minute) after the camera has been finally operated.

Also, the termination condition may be a condition that a separate termination input means is performed. For example, when the touch input device 100 includes a separate termination key 158 or a separate back key 159, the controller 110 is able to determine whether or not the touch is input to the termination key 158 or the back key 159.

The camera is terminated (S500). Specifically, when the controller 110 determines that the termination condition is satisfied, the camera can be terminated.

When the marks 151 to 157 are translucent, the image being photographed is not completely hidden by the marks 151 to 157 displayed on the touch screen 130, and the marks 151 to 157 are not completely invisible. Therefore, the user is allowed to use conveniently.

Here, while it has been described that the marks 151 to 157 are translucent, the marks 151 to 157 are not necessarily limited to this. The marks 151 to 157 may be opaque or transparent according to setting. The translucent degree of the marks 151 to 157 may be controlled according to the setting.

Here, the marks 151 to 157 positioned on the touch screen 130 may be spaced apart from each other by an interval greater than a first predetermined interval "a".

Here, the first predetermined interval "a" is the minimum interval for preventing that an unintended mark is selected by the error of the touch position detected when the touch is input to the one mark. Therefore, as shown in FIG. 8*b*, since the shutter mark 151, the zoom-in mark 152, and the zoom-out mark 153 are spaced apart from each other by the first predetermined interval "a", the zoom-in mark 152 and the zoom-out mark 153 may not be affected by the touch input to the shutter mark 151.

Here, the marks 151 to 157 positioned on the touch screen 130 may be spaced apart from the edge of the touch screen 130 by an interval greater than a second predetermined interval "b". Here, when the touch is input to the mark, the second predetermined interval "b" intends that an unintended mark is not selected by the error of the detected touch position, which is generated from the edge of the touch screen 130 or an intended mark is selected. Therefore, as shown in FIG. 8*b*, the touch input to the zoom-in mark 152 can be detected without error thanks to the second predetermined interval "b".

Here, while it is shown in FIG. 8*b* that the first predetermined interval "a" is greater than the second predetermined interval "b", there is no limit to this. The second predetermined interval "b" may be greater than the first predetermined interval "a", or the first predetermined interval "a" may be the same as the second predetermined interval "b".

Although preferred embodiments of the present invention were described above, these are just examples and do not limit the present invention. Further, the present invention may be changed and modified in various ways, without departing from the essential features of the present invention by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A method for operating a camera included in a touch input device including a touch screen, the method comprising:
    determining, by a processor, a capacitance pattern for a varying capacitance throughout the touch screen when the touch screen is underwater and no touch input occurs;
    resetting, by the processor, a varying reference capacitance for determining whether a touch input by an object occurs or not, the varying reference capacitance being reset based on the determined capacitance pattern when the touch screen is underwater and no touch input occurs; and
    receiving, by the touch screen, a touch pressure by the object underwater; and
    controlling operation of the camera according to the touch pressure to the touch screen.

2. The method of claim 1, wherein the resetting the varying reference capacitance is performed repeatedly at a predetermined cycle.

3. The method of claim 1, wherein, the controlling the operation of the camera underwater comprises photographing by touching a shutter mark positioned on the touch screen.

4. The method of claim 1, wherein, the controlling the operation of the camera underwater comprises performing zoom-in by touching a zoom-in mark positioned on the touch screen and zoom-out by touching a zoom-out mark positioned on the touch screen.

5. The method of claim 1, wherein, the controlling the operation of the camera underwater comprises selecting a front camera mode or a rear camera mode by touching a switch mark positioned on the touch screen.

6. The method of claim 1, wherein, the controlling the operation of the camera underwater comprises performing a view mode for displaying a photographed picture or video by touching a view mark positioned on the touch screen.

7. The method of claim 1, wherein, the controlling the operation of the camera underwater comprises selecting a picture mode or a video mode by touching a camera mode mark positioned on the touch screen.

8. The method of claim 1, wherein marks positioned on the touch screen are spaced apart from each other by an interval greater than a first predetermined interval.

9. The method of claim 1, wherein marks positioned on the touch screen are spaced apart from the edge of the touch screen by an interval greater than a second predetermined interval.

10. A touch input device for operating a camera, the touch input device comprising:
    a touch screen; and
    a processor:
        determining a capacitance pattern for a varying capacitance throughout the touch screen when the touch screen is underwater and no touch input occurs;
        resetting a varying reference capacitance for determining whether a touch input by an object occurs or not, the varying reference capacitance being reset based on the determined capacitance pattern when the touch screen is underwater and no touch input occurs; and
    receiving, by the touch screen, the touch pressure by the object underwater; and
    controlling operation of the camera according to the touch pressure to the touch screen.

* * * * *